United States Patent
Wei et al.

(10) Patent No.: US 12,482,251 B2
(45) Date of Patent: Nov. 25, 2025

(54) SYSTEMS, METHODS AND TECHNIQUES FOR LEARNING AND USING SPARSE INSTANCE-DEPENDENT ATTENTION FOR EFFICIENT VISION TRANSFORMERS

(71) Applicant: L'OREAL, Paris (FR)

(72) Inventors: Cong Wei, Toronto (CA); Brendan Duke, Toronto (CA); Ruowei Jiang, Toronto (CA); Parham Aarabi, Richmond Hill (CA)

(73) Assignee: L'OREAL, Paris (FR)

( * ) Notice: Subject to any disclaimer, the term of this patent is extended or adjusted under 35 U.S.C. 154(b) by 171 days.

(21) Appl. No.: 18/140,055

(22) Filed: Apr. 27, 2023

(65) Prior Publication Data
US 2024/0362902 A1 Oct. 31, 2024

(51) Int. Cl.
*G09G 5/00* (2006.01)
*G06T 7/246* (2017.01)
(Continued)

(52) U.S. Cl.
CPC .............. *G06V 10/82* (2022.01); *G06T 7/246* (2017.01); *G06T 11/60* (2013.01); *G06V 10/764* (2022.01);
(Continued)

(58) Field of Classification Search
CPC ......... G06T 19/006; G06T 19/00; G06T 7/74; G06T 7/94; G06T 11/00;
(Continued)

(56) References Cited

U.S. PATENT DOCUMENTS

2018/0350144 A1* 12/2018 Rathod .............. G06Q 20/3224
2019/0130213 A1    5/2019 Shazeer et al.
(Continued)

OTHER PUBLICATIONS

Preliminary Search Report and Written Opinion dated Mar. 22, 2024 in corresponding French Patent Application No. 2310590, 10 pages.
(Continued)

*Primary Examiner* — Gordon G Liu
(74) *Attorney, Agent, or Firm* — Oblon, McClelland, Maier & Neustadt, L.L.P.

(57) ABSTRACT

Vision Transformers (ViT) have shown their competitive advantages performance-wise compared to convolutional neural networks (CNNs) though they often come with high computational costs. Methods, systems and techniques herein learn instance-dependent attention patterns, utilizing a lightweight connectivity predictor module to estimate a connectivity score of each pair of tokens. Intuitively, two tokens have high connectivity scores if the features are considered relevant either spatially or semantically. As each token only attends to a small number of other tokens, the binarized connectivity masks are often very sparse by nature providing an opportunity to accelerate the network via sparse computations. Equipped with the learned unstructured attention pattern, sparse attention ViT produces a superior Pareto-optimal trade-off between FLOPs and top-1 accuracy on ImageNet compared to token sparsity (48%~69% FLOPs reduction of MHSA; accuracy drop within 0.4%). Combining attention and token sparsity reduces VIT FLOPs by over 60%.

21 Claims, 6 Drawing Sheets

(51) Int. Cl.
| | |
|---|---|
| G06T 11/60 | (2006.01) |
| G06V 10/764 | (2022.01) |
| G06V 10/82 | (2022.01) |
| G06V 20/20 | (2022.01) |
| G06V 40/16 | (2022.01) |

(52) U.S. Cl.
CPC ............ *G06V 20/20* (2022.01); *G06V 40/161* (2022.01); *G06T 2207/20081* (2013.01); *G06T 2207/20084* (2013.01); *G06T 2207/30201* (2013.01)

(58) Field of Classification Search
CPC . G06T 2207/10012; G06T 2207/20021; G06T 7/50; G06T 7/246; G06T 11/60; G06T 2207/20081; G06T 2207/20084; G06F 3/011; G06F 3/012; G06F 3/04815; G02B 27/017; G02B 1/041; G02B 2027/0178; G02B 5/18; G02B 27/4205; G02B 27/0172; G02B 27/0101; H04L 67/52; H04N 7/152; G06V 20/20; G06V 10/44; G06V 10/82; G06V 10/764; G06V 40/161; G06Q 10/087
USPC .......................................................... 345/633
See application file for complete search history.

(56) References Cited

U.S. PATENT DOCUMENTS

| | | | | |
|---|---|---|---|---|
| 2021/0104321 | A1* | 4/2021 | Lipsky | ................... G16H 20/10 |
| 2021/0390410 | A1 | 12/2021 | Vaswani et al. | |
| 2023/0103997 | A1* | 4/2023 | Li | ......................... G06V 10/761 382/156 |
| 2023/0133305 | A1* | 5/2023 | Wang | ................... G06N 3/0495 706/41 |
| 2024/0419382 | A1* | 12/2024 | Dekel | ................. G06V 10/761 |

OTHER PUBLICATIONS

Cong Wei, et al., "Sparsifiner: Learning Sparse Instance-Dependent Attention for Efficient Vision Transformers," Arxiv.org, Cornell University Library, Mar. 24, 2023, 10 pages.
Qi Han, et al., "Demystifying Local Vision Transformer: Sparse Connectivity, Weight Sharing, and Dynamic Weight," Arxiv.org, Cornell University Library, Jun. 8, 2021, 23 pages.
Iz Beltagy, Matthew E Peters, and Arman Cohan. Long former: The long-document transformer. arXiv preprint arXiv:2004.05150, 2020.
Gedas Bertasius, Heng Wang, and Lorenzo Torresani. Is space-time attention all you need for video understanding? In ICML, vol. 2, p. 4, 2021.
Nicolas Carion, Francisco Massa, Gabriel Synnaeve, Nicolas Usunier, Alexander Kirillov, and Sergey Zagoruyko. End-to-End Object Detection with Transformers. In ECCV, 2020.
Nicolas Carion, Francisco Massa, Gabriel Synnaeve, Nicolas Usunier, Alexander Kirillov, and Sergey Zagoruyko. End-to-end object detection with transformers. In European conference on computer vision, pp. 213-229. Springer, 2020.
Mark Chen, Alec Radford, Rewon Child, Jeffrey Wu, Hee-woo Jun, David Luan, and Ilya Sutskever. Generative pre-"training from pixels. In International conference on machine "learning, pp. 1691-1703. PMLR, 2020.
Bowen Cheng, Ishan Misra, Alexander G. Schwing, Alexander Kirillov, and Rohit Girdhar. Masked-attention mask transformer for universal image segmentation. 2022.
Bowen Cheng, Alexander G. Schwing, and Alexander Kirillov. Per-pixel classification is not all you need for semantic segmentation. 2021.
Rewon Child, Scott Gray, Alec Radford, and Ilya Sutskever. Generating long sequences with sparse transformers. In arXiv:1904.10509, 2019.
Krzysztof Marcin Choromanski, Valerii Likhosherstov, David Dohan, Xingyou Song, Andreea Gane, Tamas Sar-los, Peter Hawkins, Jared Quincy Davis, Afroz Mohiuddin, Lukasz Kaiser, David Benjamin Belanger, Lucy J Colwell, and Adrian Weller. Rethinking attention with performers. In ICLR, 2021.
Zhigang Dai, Bolun Cai, Yugeng Lin, and Junying Chen. Up-detr: Unsupervised pre-training for object detection with transformers. In Proceedings of the IEEE/CVF conference on computer vision and pattern recognition, pp. 1601-1610, 2021.
Jia Deng, Wei Dong, Richard Socher, Li-Jia Li, Kai Li, and Li Fei-Fei. Imagenet: A Large-scale Hierarchical Image Database. In CVPR, 2009.
Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An Image is Worth 16x16 Words: Transformers for Image Recognition at Scale. In ICLR, 2021.
Brendan Duke, Abdalla Ahmed, Christian Wolf, Parham Aarabi, and Graham W. Taylor. SSTVOS: Sparse Spatiotemporal Transformers for Video Object Segmentation. In CVPR, 2021.
Qihua Feng, Peiya Li, Zhixun Lu, Chaozhuo Li, Zefang Wang, Zhiquan Liu, Chunhui Duan, and Feiran Huang. Evit: Privacy-preserving image retrieval via encrypted vision transformer in cloud computing. arXiv preprint arXiv:2208.14657, 2022.
Jonathan Ho, Nal Kalchbrenner, Dirk Weissenborn, and Tim Salimans. Axial attention in multidimensional transformers. arXiv preprint arXiv:1912.12180, 2019.
Zi-Hang Jiang, Qibin Hou, Li Yuan, Daquan Zhou, Yujun Shi, Xiaojie Jin, Anran Wang, and Jiashi Feng. All tokens matter: Token labeling for training better vision transformers. Advances in Neural Information Processing Systems, 34:18590-18602, 2021.
Angelos Katharopoulos, Apoorv Vyas, Nikolaos Pappas, and François Fleuret. Transformers are rnns: Fast autoregressive transformers with linear attention. In International Conference on Machine Learning, pp. 5156-5165. PMLR, 2020.
Nikita Kitaev, Łukasz Kaiser, and Anselm Levskaya. Reformer: The efficient transformer. arXiv preprint arXiv:2001.04451, 2020.
Juho Lee, Yoonho Lee, Jungtaek Kim, Adam Kosiorek, Seungjin Choi, and Yee Whye Teh. Set transformer: A frame-work for attention-based permutation-invariant neural net-works. In International conference on machine learning, pp. 3744-3753. PMLR, 2019.
Ze Liu, Han Hu, Yutong Lin, Zhullang Yao, Zhenda Xie, Yixuan Wei, Jia Ning, Yue Cao, Zheng Zhang, Li Dong, Furu Wei, and Baining Guo. Swin transformer v2: Scaling up capacity and resolution. In CVPR, 2022.
Ze Liu, Yutong Lin, Yue Cao, Han Hu, Yixuan Wei, Zheng Zhang, Stephen Lin, and Baining Guo. Swin transformer: Hierarchical vision transformer using shifted windows. In ICCV, 2021.
Niki Parmar, Ashish Vaswani, Jakob Uszkoreit, Lukasz Kaiser, Noam Shazeer, Alexander Ku, and Dustin Tran. Image transformer. In International conference on machine learning, pp. 4055-4064. PMLR, 2018.
Hao Peng, Nikolaos Pappas, Dani Yogatama, Roy Schwartz, Noah A Smith, and Lingpeng Kong. Random feature attention. arXiv preprint arXiv:2103.02143, 2021.
Jiezhong Qiu, Hao Ma, Omer Levy, Scott Wen-tau Yih, Sinong Wang, and Jie Tang. Blockwise self attention for long document understanding. arXiv preprint arXiv:1911.02972, 2019.
Jack W Rae, Anna Potapenko, Siddhant M Jayakumar, and Timothy P Lillicrap. Compressive transformers for long-range sequence modelling. arXiv preprint arXiv:1911.05507, 2019.
Yongming Rao, Wenliang Zhao, Benlin Liu, Jiwen Lu, Jie Zhou, and Cho-Jui Hsieh. DynamicViT: Efficient Vision Transformers with Dynamic Token Sparsification. In Advances in Neural Information Processing Systems (NeurIPS), 2021.
Cedric Renggli, André Susano Pinto, Neil Houlsby, Basil Mustafa, Joan Puigcerver, and Carlos Riquelme. Learning to merge tokens in vision transformers. arXiv preprint arXiv:2202.12015, 2022.
Aurko Roy, Mohammad Saffar, Ashish Vaswani, and David Grangier. Efficient content-based sparse attention with routing transformers. Transactions of the Association for Computational Linguistics, 9:53-68, 2021.

(56) References Cited

OTHER PUBLICATIONS

Michael Ryoo, AJ Piergiovanni, Anurag Arnab, Mostafa Dehghani, and Anelia Angelova. TokenLearner: Adaptive Space-Time Tokenization for Videos. In NeurIPS, 2021.

Yehui Tang, Kai Han, Yunhe Wang, Chang Xu, Jianyuan Guo, Chao Xu, and Dacheng Tao. Patch slimming for efficient vision transformers. In CVPR, 2022.

Yehui Tang, Kai Han, Yunhe Wang, Chang Xu, Jianyuan Guo, Chao Xu, and Dacheng Tao. Patch slimming for efficient vision transformers. In Proceedings of the IEEE/CVF Conference on Computer Vision and Pattern Recognition, pp. 12165-12174, 2022.

Yi Tay, Dara Bahri, Liu Yang, Donald Metzler, and Da-Cheng Juan. Sparse sinkhorn attention. In International Conference on Machine Learning, pp. 9438-9447. PMLR, 2020.

Hugo Touvron, Matthieu Cord, Matthijs Douze, Francisco Massa, Alexandre Sablayrolles, and Herve Jegou. Training Data-efficient Image Transformers & Distillation through Attention. In ICML, 2021.

Ashish Vaswani, Noam Shazeer, Niki Parmar, Jakob Uszko-reit, Llion Jones, Aidan N Gomez, Łukasz Kaiser, and Illia Polosukhin. Attention is all you need. In NeurIPS. 2017.

Elena Voita, David Talbot, Fedor Moiseev, Rico Sennrich, and Ivan Titov. Analyzing multi-head self-attention: Specialized heads do the heavy lifting, the rest can be pruned. In ACL, 2019.

Sinong Wang, Belinda Z. Li, Madian Khabsa, Han Fang, and Hao Ma. Linformer: Self-attention with linear complexity, 2020.

Wenhai Wang, Enze Xie, Xiang Li, Deng-Ping Fan, Kaitao Song, Ding Liang, Tong Lu, Ping Luo, and Ling Shao. Pyramid vision transformer: A versatile backbone for dense prediction without convolutions. In Proceedings of the IEEE/CVF International Conference on Computer Vision, pp. 568-578, 2021.

Li Yuan, Yunpeng Chen, Tao Wang, Weihao Yu, Yujun Shi, Zi-Hang Jiang, Francis EH Tay, Jiashi Feng, and Shuicheng Yan. Tokens-to-token vit: Training vision transformers from scratch on imagenet. In Proceedings of the IEEE/CVF International Conference on Computer Vision, pp. 558-567, 2021.

Manzil Zaheer, Guru Guruganesh, Kumar Avinava Dubey, Joshua Ainslie, Chris Alberti, Santiago Ontanon, Philip Pham, Anirudh Ravula, Qifan Wang, Li Yang, et al. Big Bird: Transformers for Longer Sequences. In NeurIPS, 2020.

Wang Zeng, Sheng Jin, Wentao Liu, Chen Qian, Ping Luo, Wanli Ouyang, and Xiaogang Wang. Not all tokens are equal: Human-centric visual analysis via token clustering transformer. In Proceedings of the IEEE/CVF Conference on Computer Vision and Pattern Recognition, pp. 11101-11111, 2022.

Yanhong Zeng, Jianlong Fu, and Hongyang Chao. Learning joint spatial-temporal transformations for video inpainting. In European Conference on Computer Vision, pp. 528-543. Springer, 2020.

Pengchuan Zhang, Xiyang Dai, Jianwei Yang, Bin Xiao, Lu Yuan, Lei Zhang, and Jianfeng Gao. Multi-scale vision long- former: A new vision transformer for high-resolution image encoding. In Proceedings of the IEEE/CVF International Conference on Computer Vision, pp. 2998-3008, 2021.

Minghang Zheng, Peng Gao, Renrui Zhang. Kunchang Li, Xiaogang Wang, Hongsheng Li, and Hao Dong. End-to-end object detection with adaptive clustering transformer. arXiv preprint arXiv:2011.09315, 2020.

Luowei Zhou, Yingbo Zhou, Jason J Corso, Richard Socher, and Caiming Xiong. End-to-end dense video captioning with masked transformer. In Proceedings of the IEEE conference on computer vision and pattern recognition, pp. 8739-8748, 2018.

Xizhou Zhu, Weijie Su, Lewei Lu, Bin Li, Xiaogang Wang, and Jifeng Dai. Deformable detr: Deformable transformers for end-to-end object detection. arXiv preprint arXiv:2010.04159, 2020.

\* cited by examiner

SYSTEMS, METHODS AND TECHNIQUES FOR LEARNING AND USING SPARSE INSTANCE-DEPENDENT ATTENTION FOR EFFICIENT VISION TRANSFORMERS

FIELD

This application relates to computer processing of images using artificial intelligence networks and more particularly to systems, devices, methods, and techniques for efficient vision transformer networks to learn sparse instance-dependent attention.

BACKGROUND

Vision Transformers (ViTs) have emerged as a dominant model for fundamental vision tasks such as image classification [12], object detection [3], and semantic segmentation [6, 7] (references in square parenthesis are listed in a references section herein below. Each of the references is incorporated herein in their respective entireties.) Transformers, a type of deep learning, measure relationships—called "attention"—between pairs of input tokens. A token can be a word in the case of text strings or a section of an image (e.g. a section of pixels). Measuring "attention" has a cost that is quadratic in the number of tokens. Sections along with positional embeddings are placed in a sequence (e.g. mimicking a text string). Each section is arranged (projected) into a linear sequence and multiplied by the embedding matrix. The embeddings define learnable vectors for the deep learning network provided by the transformer and the multiplication result. Scaling ViTs to a large number of tokens is challenging due to the quadratic computational complexity of multi-head self-attention (MHSA) [34]. This is particularly disadvantageous for large-scale vision tasks because computing on high-resolution and high-dimensionality inputs is desirable. For example, input modalities such as video frames and 3D point clouds have a large number of tokens even for basic use cases.

Prior works have largely taken two approaches to improve the computational efficiency of ViTs: (i) token pruning and (ii) using fixed sparse attention patterns in MHSA. Token pruning methods reduce the number of tokens by a fixed ratio called the keep rate, but accuracy degrades quickly when pruning early layers in the network [14, 29, 30]. Introducing token pruning into shallower layers causes a significant 3.16% top-1 accuracy drop on ImageNet due to the restriction of pruning an entire token. Existing methods that alleviate token pruning take an attention matrix connectivity-pruning approach using fixed sparse attention patterns [8, 20, 21, 23, 39] to prune individual connectivities of the attention matrix. However, fixed attention patterns limit the capacity of the self-attention connections to a fixed subset of tokens, which is less effective compared with the direct communication between tokens in full self-attention. Rather, it is desirable to design sparse attention algorithms that mimic the instance-dependent nature of full self-attention [34], thereby capturing the variable distribution of semantic information in the input image content.

It is thus desirable to scale ViTs to larger, more complex vision tasks, while managing the quadratic nature of the cost of self-attention.

SUMMARY

Vision Transformers (ViT) have shown their competitive advantages performance-wise compared to convolutional neural networks (CNNs) though they often come with high computational costs. Systems, devices, methods, and techniques herein learn instance-dependent attention patterns, utilizing a lightweight connectivity predictor module to estimate a connectivity score of each pair of tokens. Intuitively, two tokens have high connectivity scores if the features are considered relevant either spatially or semantically. As each token only attends to a small number of other tokens, the binarized connectivity masks are often very sparse by nature providing an opportunity to accelerate the network via sparse computations. For convenience, systems, devices, methods, and techniques herein are assigned the nickname, "Sparsifiner". Equipped with the learned unstructured attention pattern, sparse attention ViT produces a superior Pareto-optimal trade-off between FLOPs and top-1 accuracy on ImageNet compared to token sparsity (48%~69% FLOPs reduction of MHSA; accuracy drop within 0.4%). Combining attention and token sparsity reduces ViT FLOPs by over 60%.

BRIEF DESCRIPTION OF THE DRAWINGS

FIGS. 2A-2C show prior art approaches and FIG. 2D shows an approach in accordance with an embodiment herein.

FIG. 7 is an array of images showing that a connectivity mask can be computed by sparse-sparse matrix multiplication, visualizing the up-projection matrix $W^{up}$ of the first six layers of the ViT in accordance with an embodiment. FIG. 8 visualizes a post-softmax low-rank attention matrix, showing a sparse basis coefficient of the 5th attention head over 12 layers of the ViT in accordance with an embodiment.

DETAILED DESCRIPTION

Embodiments herein are described in relation to systems, devices, methods, and techniques such as those employed by one or more computing processors (e.g. of one or more computing devices) coupled to one or more storage devices. The storage devices, such a memory or other non-transitory devices, store computer readable instructions that when executed cause the processors to perform steps or operations. The computing devices, etc. can be located in one or more locations. The steps or operations generally relate to image processing such as to perform classification, localization, segmentation, generation, or other image processing tasks.

Systems, devices, methods, and techniques herein relate to deep neural networks (DNNs) comprising ViTs. Such ViTs can comprise a component of a DNN engine of a (software) application for image processing. In an embodiment, the DNN engine comprises a component of an application providing virtual reality or augmented reality experience to a user. For example, a user may provide an image or a series of images (e.g. of the user in the form of a selfie image or a video selfie comprising a series of images) and receive an output image a series of images, or video derived from the input digital content. In an embodiment, an output image comprises one or more effects applied to features of an input image such as features detected by the DNN engine. In an embodiment, multiple DNN engines can also be combined with the ViT. Other processing techniques including other image processing techniques (e.g. to apply effects, etc.) can also be combined. Output from the DNN Engine can be provided to an effects pipeline for providing an effect such as one associated with a feature localized in the input image.

In an embodiment, during operation, digital images are parsed into smaller flattened image patches. In an embodiment, the flattened image patches are imputed into a trained ViT encoder which recognizes/classifies objects digitally encoded in the images. In an embodiment, image recognition/classification includes image classification, object detection, image segmentation, temporal action detection, and the like. In an embodiment, image recognition/classification includes determining the presence, absence, severity, dimensions, motion, texture, color, or the like of an object in a digital image or series of digital images.

Figure 1:
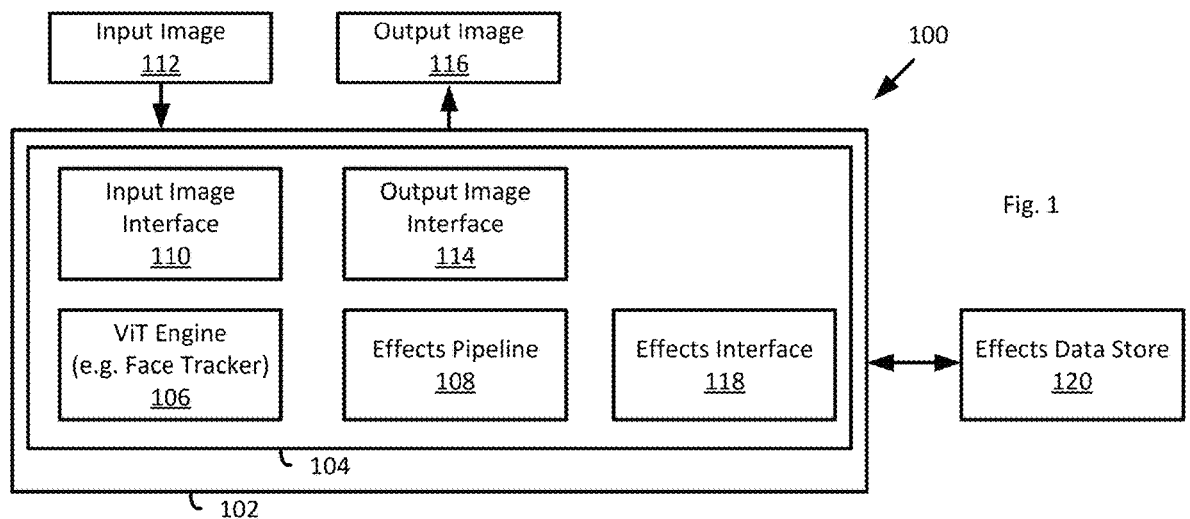
FIG. 1 is a block diagram of a computing system in accordance with an embodiment.
Figure 2A:
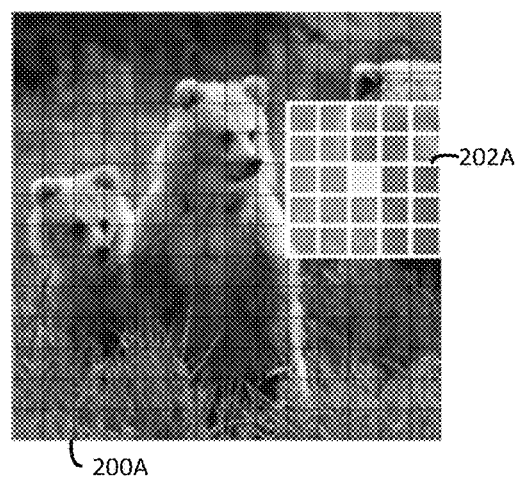
FIGS. 2A, 2B, 2C and 2D are illustrations showing a comparison of approaches to attention mechanisms, where
Figure 2B:
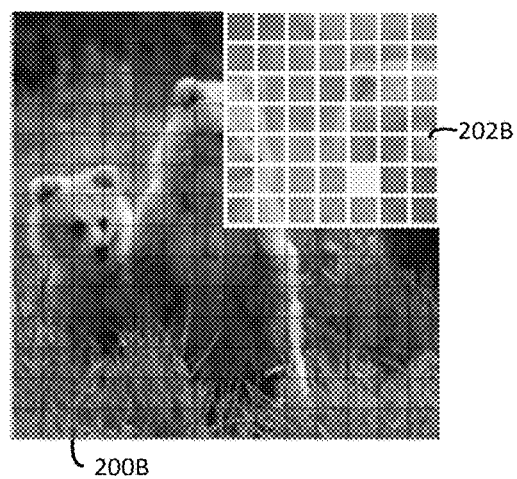
Figure 2C:
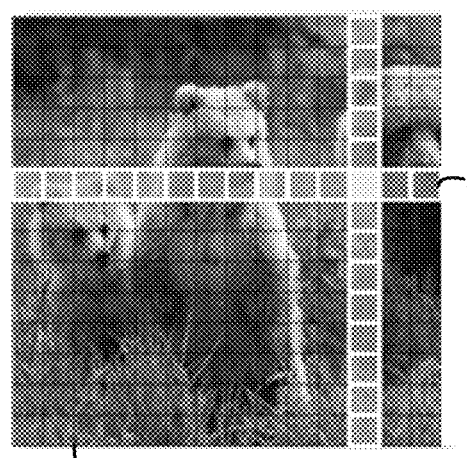
Figure 2D:
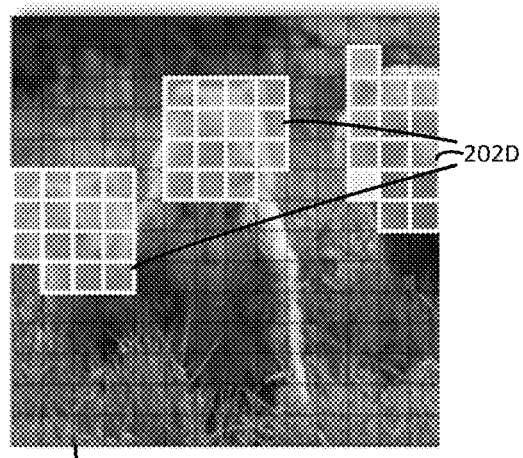

In an embodiment, the software application provides a user with an augmented reality experience such as to virtually try on a product or service. For example, in an embodiment, the software application provides a virtual try on (VTO) environment allowing the user to experience digital makeup products and engage in virtual makeup styling services. In an embodiment, during operation, the DNN engine comprises a face tracker engine that identifies, localizes, and tracks a feature of a face. Output of the engine such as face points for localizing the face can be provided to an effects pipeline. In an embodiment the effects pipeline can resize, reshape, recolor the feature using one or more transforms. In an embodiment the effects pipeline can simulate an effect such as a makeup effect associated with the feature, or the feature as resized or reshaped. In an embodiment the effects pipeline can simulate an effect such a physicals signs of skin aging. In an embodiment, effects include, among others, any one or more of a size effect, a shape effect, a hair effect, a nail effect, a makeup effect, or an aging effect, for example. In an embodiment, effects include, among others, hue effects, tint effects, tone effects, or shade effects. In an embodiment, the software application provides computational circuitry for enabling a pixel by pixel application of a digital effect within the VTO environment In an embodiment, a digital VTO experience is provided via an e-commerce interface for example. In an embodiment, digital VTO experience is provided via a Web 2.0 user-friendly interface. In an embodiment, the e-commerce interface may provide examples of makeup to virtually try on and a purchase interface to purchase instances of makeup products, for example including a product tried on virtually. Selections of products (such as from a product data store) can be presented to virtually try on such as by various techniques, including recommendations based on customer specific information and/or product relationships, etc. In an embodiment the e-commerce interface is provided via a website and a user uploads a user image via the website for processing to generate the output image for the virtual try on experience. FIG. 1 is a block diagram of a system 100 configured to provide a VTO experience in accordance with an embodiment. There is a computing device 102 having a non-transitory storage device 104 storing a ViT engine 106 (e.g. a face tracker defined using the methods and techniques herein) to provide face information (not shown) to an effects pipeline 108. Computing device 102 provides: an input image interface 110 to receive an input image 112 for image processing and an output image interface 114 to provide an output image 116. In an embodiment, output image 116 comprises an effect. In an embodiment, the effect is obtained via effect interface 118 in communication with effects data store 120.

In an embodiment, the effect is applied by pipeline 108 using the face information. In an example, the effect comprises a makeup effect (e.g. an eyeliner applied around an area of one or more eyes) defined in association with a face feature identified by ViT engine 106 from input image 112. For example, effects data store 120 can store instances of effects, the effects can be associated with a product and the product can be associated with a brand. A brand can be a makeup brand, a product can be an eyeliner, a lipstick, or other makeup, and an instance can be a shade or other product feature—e.g. a finish feature such as matte, gloss, glitter, etc. One or more than one effect can be applied such as to provide a virtual try on experience. In an embodiment, a comparison between a no effect applied and an effect applied (e.g. comparing input image and output image) can be provided. In an embodiment, a comparison between two output images with respective effects applied can be provided. In an example, the pipeline renders the effect such as in a layer over input image 112 (or an image defined therefrom). Effects for hair, nails or other products can also be stored and applied such as using an applicable ViT Engine for such an application.

In an embodiment a system comprises a Vision Transformer (ViT) configured to parse a digital image forming part of an augmented reality experience into image patches (e.g. smaller, flattened images patches). The ViT is trained to recognize/classify objects digitally encoded in the image patches and to generate image classification information, object detection information, image segmentation information, or temporal action detection information. In an embodiment, information obtained from the image processing is used to provide the augmented reality experience, for example, such as to apply an effect transform to an image derived from the parsed digital image. In an embodiment, an augmented reality component is operably coupled to an effect pipeline component including computational circuitry configured to apply an effect transform to an image derived from the parsed digital image. In an embodiment, the effect transform is chosen responsive to generating the image classification information, the object detection information, the image segmentation information, or the temporal action detection information. In an embodiment the effect transform is further responsive to user input.

FIG. 1 illustrates computing device 102 receiving the input image 112 via input image interface 110. Input image 112 can comprise an image communicated from a different device (not shown). FIG. 1 shows interface 114 providing output image 116. The output image can be communicated to the different device. Thus, in an example, computing device 102 comprises a web device (e.g. a web site or web based service) or a cloud device. In an alternative embodiment (not shown), computing device 102 comprises a mobile device having a camera and a display device. Computing device 102 can comprise a smartphone. In the alternative embodiment, the camera captures the input image 112 and provides it for processing by ViT engine 106. In the alternative embodiment, computing device 102 provides the output image for display by the display device.

While FIG. 1 relates to a VTO application, other types of image processing using ViTs are contemplated herein and the systems methods and techniques herein are not limited to VTO applications or arrangements as shown and described for FIG. 1 unless stated.

Efficient Attention—Developing an efficient attention mechanism for high resolution image encoding is the focus of this work. Efficient attention mechanisms have been widely studied in NLP tasks to model long sequences. They can be categorized as follows: Low-rank methods such as Linformer [36] use a low-rank projection to linearize the multi-head attention operation. Linformer [36] replaces the scaled dot product with linear attention that approximates the attention with a low-rank matrix. Kernelization, including Performer [9], Linear Transformers [17], and Random Feature Attention [23] use kernels to avoid explicitly computing the attention matrix. Sparse attention with fixed attention patterns [8, 15, 22, 24]. This type of technique sparsifies the attention matrix by limiting the field of view to predefined patterns such as local and strided windows. Similarity and clustering-based methods including Routing Transformer [28], Reformer [18], and Sinkhorn Transformer [32]. These models measure token relevance by sorting or clustering and then assign tokens to buckets for within-bucket attention. Neural memory mechanisms such as Set Transformer [19], Compressive Transformer [25], and Longformer [1]. These use extra global tokens that gather long-range information as a model memory.

Vision Transformers—Recent progress has demonstrated that variants of Transformers can also be competitive alternatives to CNNs and achieve promising results on different vision tasks. In addition to image classification, Transformers have also been applied to various vision tasks, including object detection [4, 10,43,45], image generation [5,22], and video processing [41,44]. Vision Transformer (ViT) [12] splits images as small patches and treats the patches as the input word tokens. ViT shows better performance than CNN-type models with sufficient extensive training data. DeiT [33] ncorporates knowledge distillation techniques into ViT training so that a competitive Transformer can be trained using only ImageNet-1k [11]. LV-ViT [16 ] further improves the performance of ViT by introducing a new training objective named token labelling. Most of these methods have quadratic complexity of self-attention with respect to the input image size.

Efficient Vision Transformers—There is a thrust to model long sequences of image patches at much higher resolutions. Recent works such as Pyramid Vision Transformer (PVT) [37], Swin-Transformer [21], T2T-ViT [38], and Vision Longformer (ViL) [42] apply transformer layers on different resolution scales by stacking a pyramid of ViTs to form a multi-scale architecture. To achieve linear complexity, Swin-Transformer [21] uses shifted local window attention. Vision Longformer [42] adapts the local attention pattern with the global memory tokens from Long-former [1]. TimeSformer [2] applies multiple attentions, each along a single axis of the input video. Those methods all leverage fixed, predefined attention patterns to reduce the quadratic cost. In contrast, present methods in accordance with embodiments herein generate sparse dynamic attention patterns based on the input content. Another group of works reduce the number of tokens by pruning [14,26,31], or merging tokens [27,29,40]. Recent work, DynamicViT [26] and EVIT [14] study unstructured token sparsification by gradually dropping tokens in the inference of ViTs [12]. However, quadratic attention cost remains in early layers where input tokens cannot be largely sparsified. Sparsifiner methods in accordance with embodiments herein instead prune connectivities at every layer, allowing complexity savings at early layers.

FIGS. 2A-2D are illustrations 200A, 200B, 200C and 200D showing a comparison of an embodiment of the present disclosure (200D) with prior art methods using fixed attention patterns (200A-200C). The prior art methods of FIGS. 2A, 2B, and 2C address quadratic MHSA complexity using fixed sparse attention patterns, which does not consider the instance-dependent nature of semantic information in images. To address this, for example, the embodiment of FIG. 2D, incorporates an efficient module for sparse instance-dependent attention pattern prediction as further described herein.

Figure 3:
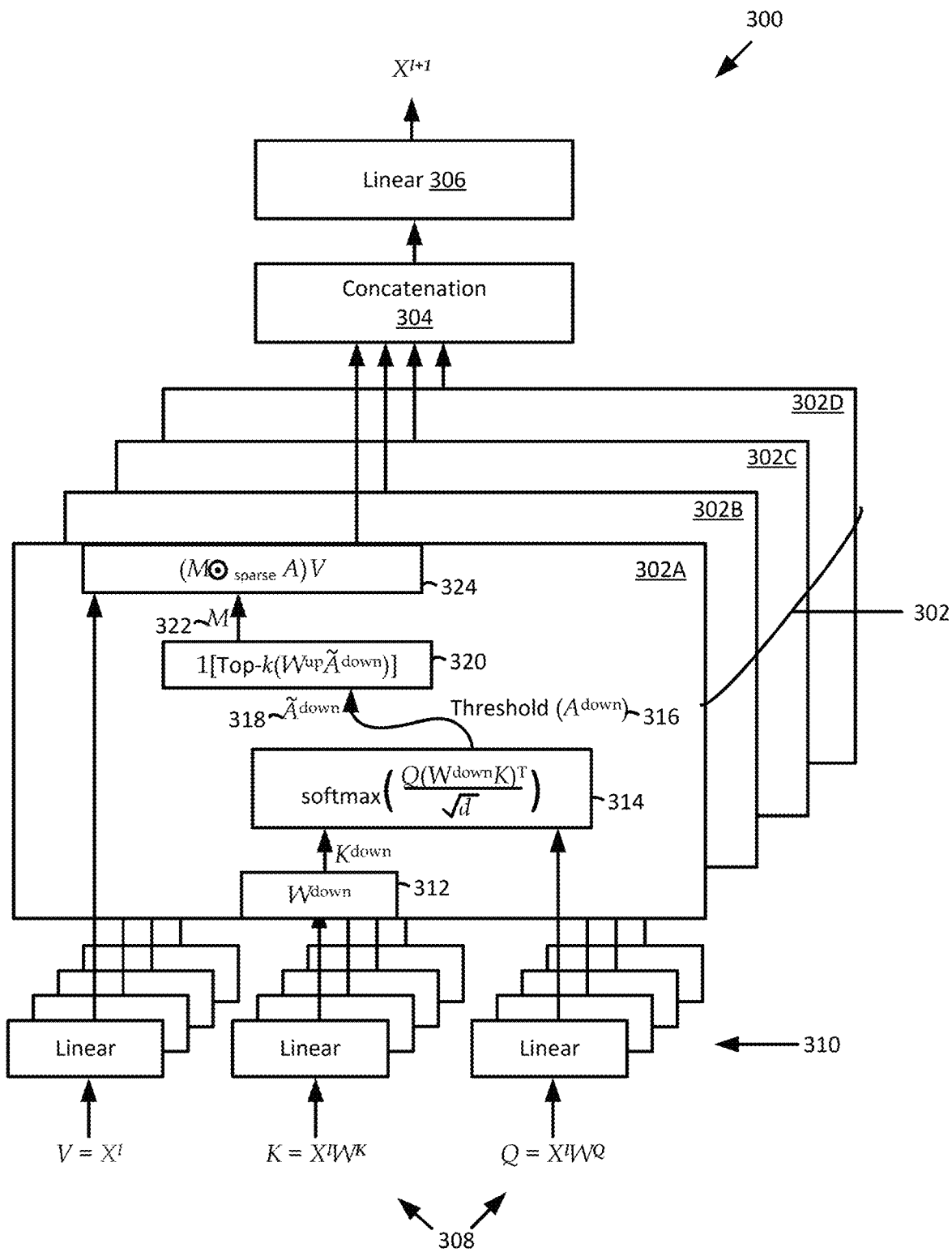
FIG. 3 is a block diagram showing a MHSA layer 300 for an embodiment with a representative four heads and showing certain details of a MHSA module 302 in accordance an embodiment.

FIG. 3 is a block diagram showing a MHSA layer 300 (e.g. in a representative layer l) for an embodiment with a representative four heads 302 comprising single (individual) heads 302A, 302B, 302C and 302D. Four heads are representative only. Each of the heads 302A-302D processes layer input $X^l$. FIG. 3 only shows certain details of one MHSA module 302A in accordance an embodiment. For clarity and brevity, the following relates to sparse full attention MHSA for a single attention head only (e.g. 302A). In practice, and in an embodiment, each attention head in a ViT is similarly configured.

It will be understood that the systems, methods and techniques herein relate to MHSA layers and their processing. MHSA layers can be used in encoder, decoder or both encoder and decoder portions of a ViT network. Thus the systems, methods and techniques herein similarly relate to encoder, decoder or both encoder and decoder portions of a ViT network.

In an embodiment, the structure 300 is based on a conventional ViT [12] configured as a backbone but with sparse attention modules at each layer, as further described herein. A concatenation function 304 is provided to concatenate the resulting output values from all attention heads 302, the result of which is feed to a linear layer 306 to produce the final output $X^{l+1}$ to provide as input to the next transformer layer (not shown).

ViT Architecture and Naïve MHSA—In an embodiment as noted, the architecture is derived from existing ViT model architecture [12] and a naïve implementation of MHSA [34]. A ViT first tokenizes an input image $I \in \mathbb{R}^{h \times w \times 3}$ into a set of n tokens $X \in \mathbb{R}^{n \times d}$, each with dimension d (not shown). Each token comprises a patch embedding, such as one obtained via linear projection of the non-overlapping image patches, and a positional encoding. The resulting sequence of tokens is then fed into MHSA modules to compute the attention matrix $A \in \mathbb{R}^{n \times n}$ as the product of query $Q \in \mathbb{R}^{n \times d} = X^l W^Q$ and key $K \in \mathbb{R}^{n \times d} = X^l W^K$ matrices (collectively 306), where the learned projection matrices $W^Q \in \mathbb{R}^{d \times d}$ and $W^K \in \mathbb{R}^{d \times d}$ compute query and key as projections of the input $X^l \in \mathbb{R}^{n \times d}$ to layer l. As per conventional ViT transformers, prior to attention processing by heads 302, the query, key and value matrices are respectively processed by a plurality of linear layers 310 for each of the (four) heads 302.

In a conventional naïve MHSA, (not shown) a full attention matrix A is computed using a compatibility function.

The function is conventionally a scaled dot product attention mechanism comprising a softmax of outer product of query and key matrices (Eq. 0):

$$A = softmax\left(\frac{Q(K)^T}{\sqrt{d}}\right), \quad (0)$$

In accordance with an embodiment, the full attention matrix A is not conventionally computed as shown and described with reference to MHSA representative head 302A.

Connectivity Mask Predictor—To enable instance-dependent and meaningful attention patterns while limiting the number of connections, for Sparsifiner, there is trained and provided a connectivity mask predictor that achieves sparsity by thresholding. Specifically, there is computed a low-rank approximation $A^{down} \in \mathbb{R}^{n \times n_{down}}$ of the attention matrix A (Eq. 1):

$$A^{down} = softmax\left(\frac{Q(W^{down}K)^T}{\sqrt{d}}\right), \quad (1)$$

which is sparsified by thresholding (Eq. 2):

$$\tilde{A}^{down}_{ij} = \begin{cases} A^{down}_{ij} & \text{if } A^{down}_{ij} > \tau \\ 0 & \text{otherwise} \end{cases}. \quad (2)$$

In the low-rank attention computation (Eq. 1), the token dimension of key matrix K is down-projected to a lower dimension $n_{down}$ using a learned projection matrix $W^{down} \in \mathbb{R}^{n_{down} \times n}$ (312). Then, a low-rank approximation of the attention matrix is computed (314) from the outer product of query and down-projected key matrices using a similar compatibility function. A threshold selection operation is applied to elements of the results of the function at 314 according to Eq. 2 (316) to enhance or otherwise perform sparsification reducing the count of non-zero elements to produce $\tilde{A}^{down}$. Note that in the low-rank attention sparsification (Eq. 2), a sparse matrix representation need not explicitly store the zeros.

Next, the connectivity mask predictor (Eq. 3) performs (320) a sparse matrix multiplication of a sparse up-projection matrix $W^{up} \in \mathbb{R}^{n \times n_{down}}$ followed by binarization. This produces an up-projected sparse connectivity mask (Eq. 3):

$$M = 1\left[Top - k\left(W^{up}\tilde{A}^{down}\right)\right] \quad (3)$$

Figure 8:
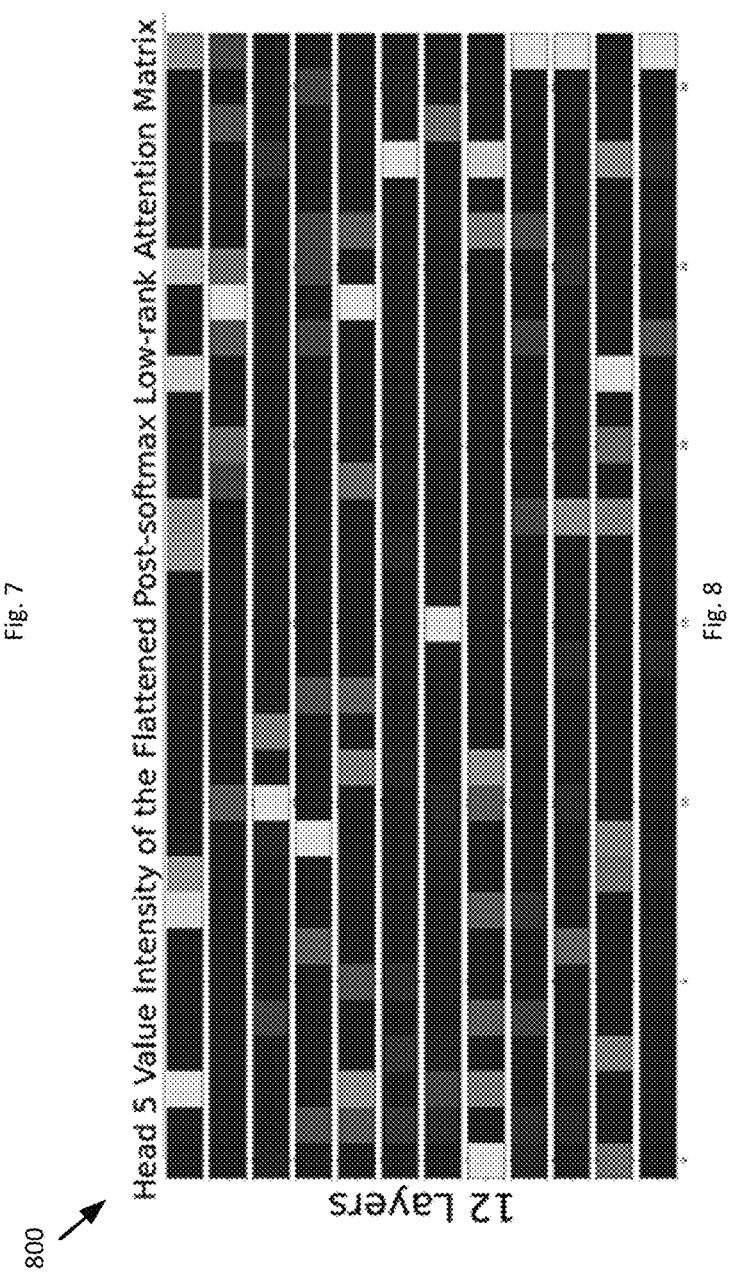

Here, $W^{up} \tilde{A}^{down}$ notes sparse-sparse matrix multiplication, which is efficiently computed. It s remarked that the post-softmax low-rank attention matrix (Eq. 1) should naturally be sparse. An example is shown in FIG. 8 described further herein below.

Selection according to Top-k is performed on the up-projected sparse attention matrix $W^{up} \tilde{A}^{down}$, which is the attention connectivity score map. k is set to the budget size B. Zero values are discarded and results binarized (values set to 1 if applicable) to produce a sparse low-rank connectivity mask $M \in \mathbb{R}^{n \times n}$ (322). Binarization is indicated by the indicator function 1[·] in the connectivity mask predictor (Eq. 3) (320).

Sparse MHSA—In a Sparsifiner embodiment, guided by the sparse connectivity mask M, only the nonzero elements of the sparse full-rank attention matrix $\tilde{A}$ are computed. With a view to ensuring computational efficiency, it is desired to have both a sparse up-projection and a sparse low-rank attention matrix. This is equivalent to reconstructing the sparse attention matrix $\tilde{A}$ as an affine combination over a set of sparse basis vectors using a sparse coefficient vector (Eq. 4):

$$\tilde{A}_{ij} = softmax\left(\frac{QK^T}{\sqrt{d}}\right)_{ij} \text{ iff } M_{ij} = 1. \quad (4)$$

Another way of formulating the sparse full-rank attention matrix is as a sparse element-wise product of the sparse connectivity mask M with the full-rank attention matrix (324) (Eq. 5):

$$\tilde{A} = M \odot_{sparse} A. \quad (5)$$

Here, $\odot_{sparse}$ is the sparse element-wise product operator, which skips multiplications by zero. Therefore, computing the sparse full-rank attention matrix $\tilde{A}$ (Eq. 4) costs only as many FLOPs as there are nonzero elements in the connectivity mask M. In particular, computing the sparse full-rank attention matrix costs less than the $O(n^2d)$ required by naïve MHSA. Sparsifiner use the low-rank approximation to learn a sparse connectivity mask $M \in \mathbb{R}^{n \times n}$ and sparse up-projection basis $W^{up}$. Using sparse matrix multiplication, Sparsifiner reduces overall MHSA FLOPs relative to Linformer without restricting the attention matrix to be low rank. Note that in Sparsifiner, the attention matrix A is not explicitly constructed, and rather is used to represent sparse attention reconstruction per Eq. 5.

Finally, Sparsifiner computes a sparse attention-value product using the sparse full-rank attention matrix $\tilde{A}$ and the value matrix V (Eq. 6):

$$X^{l+1} = \tilde{A}V. \quad (6)$$

By computing the sparse full-rank attention matrix $\tilde{A}$ (Eq. 4) guided by the sparse connectivity mask, and then computing the sparse attention-value product, the $O(n^2d)$ complexity required by the naïve MHSA operation is removed. Instead, the sparse MHSA operation in Sparsifiner performs a number of operations proportional to the number of nonzero elements in the connectivity mask M.

Objective functions—The training of Sparsifiner includes training the attention connectivity predictor modules and fine-tuning the backbone to make it adapt to sparse attention. An attention connectivity predictor can be defined similar to a segmentation prediction head. A standard cross-entropy loss is adopted:

$$\mathcal{L}_{cls} = CrossEntropy(y^{pred}, y) \quad (7)$$

where $y^{pred}$ is the predicted class distribution and y is the ground-truth class distribution.

To minimize the influence on performance of the attention sparsification process, a pre-trained backbone model is used as a teacher within a knowledge distillation framework. First, the tokens at the last layer are defined close to the ones of the teacher model, where x and $x^{teach}$ are the tokens after the last block of the Sparsifiner and the teacher model, respectively.

$$\mathcal{L}_{distill}^{token} = MSE(x, x^{teach}). \qquad (8)$$

Second, a difference of Sparsifiner and the teacher model's predictions are minimized via KL divergence:

$$\mathcal{L}_{distill}^{cls} = KL(y^{pred} \| y^{teach}). \qquad (9)$$

Third, the connectivity score map generated by the connectivity mask predictor is desired to be a good low-rank approximation of the teacher attention, which can be viewed as knowledge distillation of the attention map. The Euclidean distance between them is minimized:

$$\mathcal{L}_{distill}^{attn} = MSE(W^{up}\tilde{A}^{down}, A^{teach}). \qquad (10)$$

Finally, to enforce the sparsity of the up-projection matrix, a $L_2$ regularization is used. $L_1$ regularization was attempted but results showed that $L_2$ gives better training convergence with sufficient sparsity in practice.

$$\mathcal{L}_{spa} = \sum_i (\omega_i^{up})^2 \qquad (11)$$

The full training objective combines all objectives:

$$\mathcal{L} = \mathcal{L}_{cls} + \lambda_{distill}^{token}\mathcal{L}_{distill}^{token} + \lambda_{distill}^{cls}\mathcal{L}_{distill}^{cls} + \lambda_{distill}^{attn}\mathcal{L}_{distill}^{attn} + \lambda_{spa}\mathcal{L}_{spa} \qquad (12)$$

where the weight decay is set as 0.05 in the optimizer instead of directly adding $\lambda_{spa} L_{spa}$ to the objective.

Experiments and Results

Implementation details—In experiments, all of the models were trained on the ImageNet dataset [11]. By default, the connectivity mask predictor module is incorporated into every layer of DeiT-S [33] and LV-ViT-S [16]. In all the experiments, the reduced dimension $n_{down}$ was set to 32 and $\tau$ to 0.05 which ensures 87% sparsity ratio of the basis coefficient. The attention budget B is in the range (0, number of tokens]. Budget B is directly determined by the attention keep rate in (0, 1] as the ceiling of the keep rate multiplied by the total number of tokens.

Most of the training techniques used in DeiT-S and LV-ViT-S were followed. Pre-trained ViT models were used to initialize the backbone models. To improve speed of convergence, a two-phase training strategy was utilized. In the first phase, the backbone model was frozen and the connectivity mask predictor module trained with attention distillation loss and $L_2$ regularization only. Specifically, settings of $\lambda_{distill}^{token}=0.0$, $\lambda_{distill}^{cls}=0.0$, $\lambda_{distill}^{attn}=1.0$ were used, a threshold 1e-2 applied on basis $W^{up}$ to ensure 90% sparsity. This setting was found to help the connectivity mask predictor to learn $W^{up}$ quickly and loss converges within 5 epochs. In the second phase, the backbone model and the connectivity mask predictor module were jointly trained for another 40 epochs. Settings of $\lambda_{distill}^{token}=0.5$, $\lambda_{distill}^{cls}=0.5$, $\lambda_{distill}^{attn}=0.0$ were used.

Figure 4:
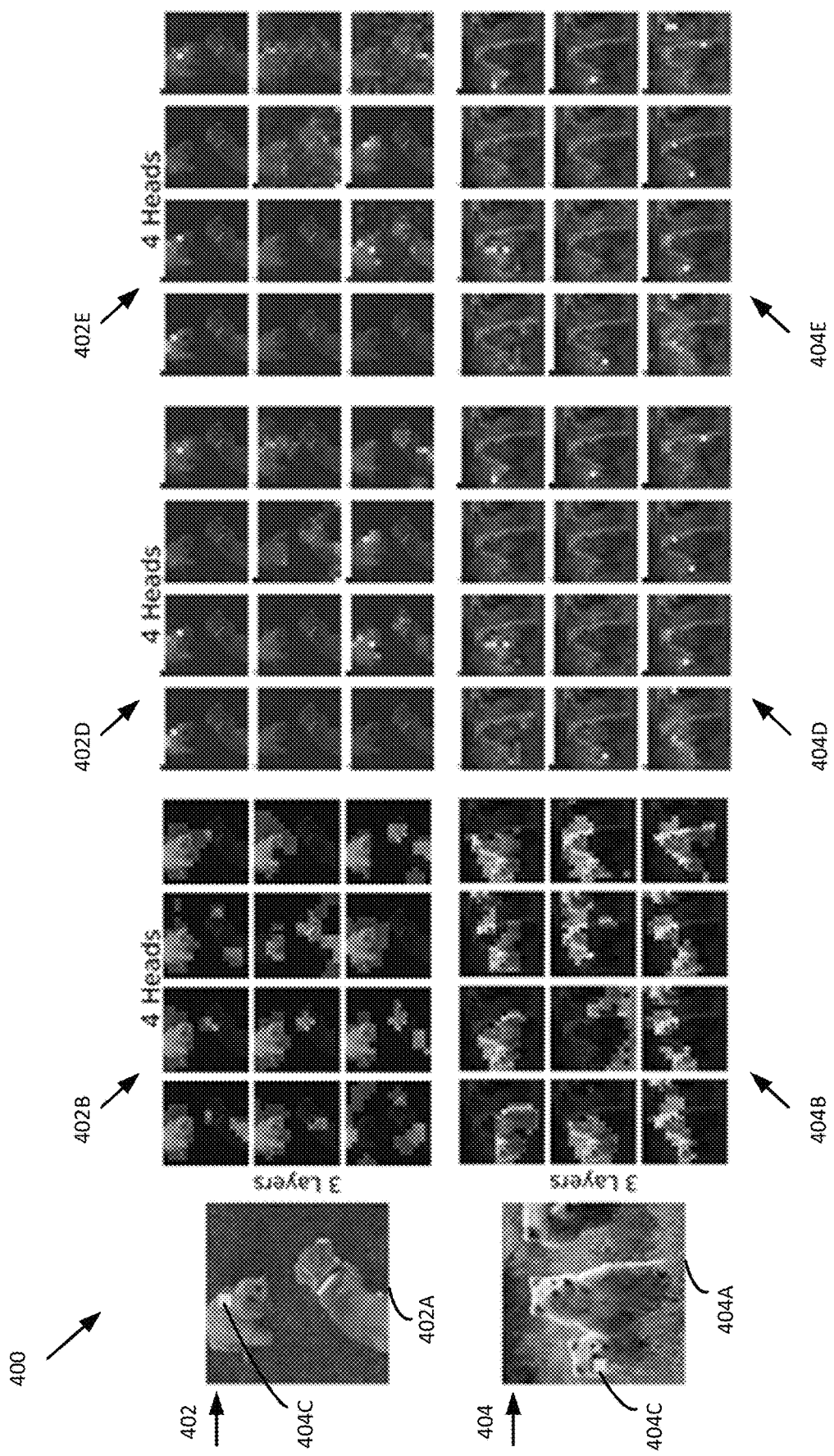
FIG. 4 shows two rows of visualizations, in accordance with an embodiment, where each row shows an example input image, an array of connectivity masks, an arrays of a sparse full attention maps, and an array of full attention maps.

Sparse connectivities and attention visualization—In order to qualitatively investigate the quality of Sparsifiner's sparse attention approximation, its connectivity mask and sparse reconstructed attention map are visualized in image array 400 in FIG. 4 that shows a first row 402 including original input image 402A of a dog, a mask array 402B of connectivity masks (M) for the query patch 402C, sparse full attention map Ã in array 402D and the full attention map A in array 402E. There is also shown a second row 404 including original input image 404A of bears, a mask array 404B of connectivity masks (M) for the query patch 404C, sparse full attention map Ã in array 404D and the full attention map A in array 404E.

I each mask array 402B, 404B the dark regions represent tokens that are not attended to by the query patch tokens 402C, 404B. For each of the four attention heads and each of the three layers in the respective rows 402 and 404, each connectivity mask (M) acts as a region proposal mechanism, which allows different attention heads to locate different informative tokens and gather diverse semantic information. Furthermore, FIG. 4 visualizes the sparse full attention map Ã in respective arrays 402D, 404D efficiently generated using the applicable connectivity masks (M) and compares them with the full attention map A in arrays 402E and 404E.

For the dog image (top row 402) layers 3-5 are visualized, while for the bear image (bottom row 404) layers 6-8 are visualized. It is observed that in earlier layers the attention map focuses more on positional information such as nearby tokens, while in later layers semantic relations with distant tokens are more important.

The sparse attention map retains all of the highest connectivity values, while discarding lower connectivity values. Hence the visualizations show that Sparsifiner retains the most salient relations for a given token, while discarding noisy background relations.

Comparison with token pruning—Sparsifiner was trained and evaluated on ImageNet and compared to state-of-the-art token pruning baselines in experiments and results data are shown in Table 1. Since the research question addresses the problem of reducing MHSA complexity, trade-offs between top-1 accuracy on ImageNet and computation in terms of MHSA FLOPs are reported in Table 1. Sparsifiner is compared against baselines by adjusting two hyperparameters: token and attention keep rate. The token keep rate is the fraction of tokens kept in the network at predetermined layers where pruning occurs. The rate is set according to established token pruning baselines [14,26]. The attention keep rate is the fraction of attention connectivities at any given MHSA layer, as determined by the connectivity mask predictor (Eq. 3). Hence, varying the attention keep rate reduces FLOPs without necessitating removal of tokens as in token pruning. But both techniques can be combined to achieve complementary effects.

TABLE 1

| Model | Tok. keep rate | Att. keep rate | MHSA (MFLOPs) | Top-1 Acc. (%) |
|---|---|---|---|---|
| DeiT-S [33] | 1.0 | 1.0 | 357.7 | 79.8 |
| EViT [14] | 0.7 | 1.0 | 193.1 (−46%) | 79.5 |

TABLE 1-continued

| Model | Tok. keep rate | Att. keep rate | MHSA (MFLOPs) | Top-1 Acc. (%) |
|---|---|---|---|---|
| DynamicViT [26] | 0.7 | 1.0 | 193.1 (−46%) | 79.3 |
| Sparsif-EViT (ours) | 0.7 | 0.25 | 113.3 (−68%) | 79.5 |
| Sparsifiner (ours) | 0.7 | 0.25 | 113.3 (−68%) | 79.3 |
| EViT [14] | 0.5 | 1.0 | 149.1 (−58%) | 78.5 |
| DynamicViT [26] | 0.5 | 1.0 | 149.1 (−58%) | 77.3 |
| Sparsif-EViT (ours) | 0.5 | 0.25 | 86.6 (−76%) | 78.7 |
| Sparsifiner (ours) | 0.5 | 0.25 | 86.6 (−76%) | 78.4 |
| LV-ViT-S [16] | 1.0 | 1.0 | 476.9 | 83.3 |
| EViT-LV-S [14] | 0.7 | 1.0 | 256.0 (−46%) | 83.0 |
| EViT-LV-S [14] | 0.5 | 1.0 | 198.8 (−58%) | 82.5 |
| DynViT-LV-S [26] | 0.7 | 1.0 | 256.0 (−46%) | 83.0 |
| DynViT-LV-S [26] | 0.5 | 1.0 | 198.8 (−58%) | 82.0 |
| Sparsif-LV-S (ours) | 1.0 | 0.5 | 339.7 (−29%) | 83.4 |
| Sparsif-LV-S (ours) | 1.0 | 0.25 | 221.7 (−54%) | 83.3 |
| Sparsif-LV-S (ours) | 1.0 | 0.1 | 149.5 (−69%) | 82.8 |

Table 1 shows Comparison with token pruning methods on DeiT-S [33] and LV-ViT-S [16] base models. Token pruning methods such as EVIT [14] and DynamicViT [26] prune tokens at fixed layers. Table 1 shows that token pruning methods combine with Sparsifiner's sparse attention connectivities to produce a complementary effect. Sparsifiner combined with EVIT [14] achieves a 68% reduction in FLOPs compared with the DeiT-S [33] baseline, while maintaining a top-1 accuracy of 79.5%. Hence Sparsifiner achieves the same top-1 accuracy as EVIT [14] with significantly better MHSA FLOPs reduction. The input resolution for the experiments is 224×224.

To provide a variety of comparisons, experiments added token pruning and Sparsifiner to two common baseline ViT models: DeiT [33] and LV-ViT [16]. On both models, Sparsifiner achieves significant computation saving while maintaining a relatively modest drop in top-1 accuracy. For example, LV-ViT-S [16] trained with Sparsifiner with an attention keep rate of 0.25 reduces the MHSA FLOPs by 53.5% while maintaining the top-1 accuracy of the baseline LV-ViT-S model on ImageNet. When used in combination with token pruning, Sparsifiner achieves an even superior reduction in MHSA FLOPs while maintaining comparable top-1 accuracy to EVIT, and superior top-1 accuracy to DynamicViT.

Figure 5:
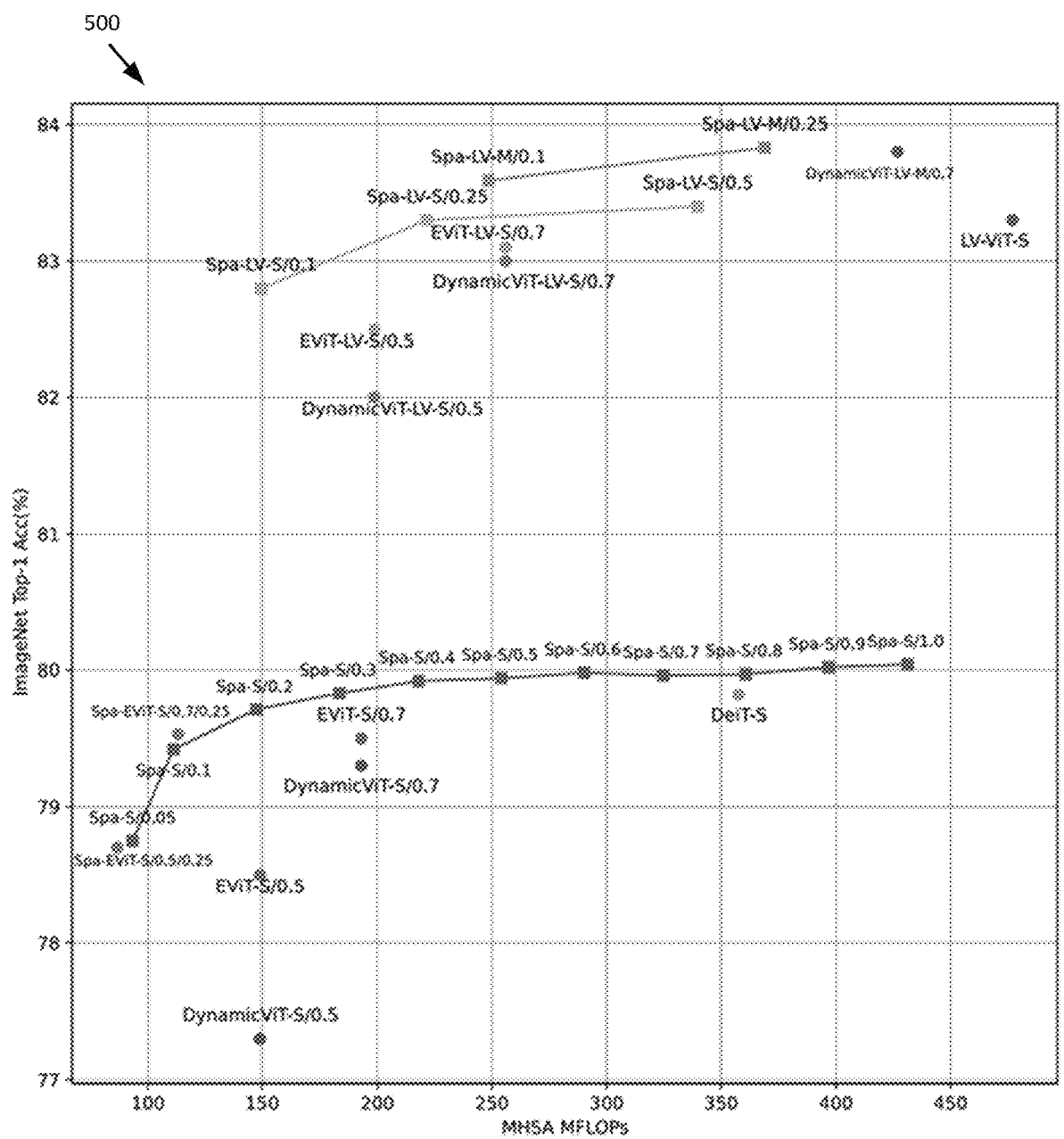
FIG. 5 is a graph of experimental results showing top-1 accuracy and MHSA MFLOPS for respective comparators and embodiments herein.

Varying MHSA attention budget—Experiments also varied the attention budget of MHSA in order to investigate the tradeoff between MHSA FLOPs and top-1 accuracy for an embodiment Sparsifiner-S as shown in Table 2. Here Sparsifiner-S represents an application of Sparsifiner method(s) and technique(s) to the structure of DeiT-S [33]. The results evaluated on ImageNet show that Sparsifiner-S produces a superior Pareto frontier compared with previous approaches as shown in graph 500 of FIG. 5. In particular, Sparsifiner-S models with attention budgets of 40 and above achieved top-1 accuracy within 0.1% of the full-rank DeiT-S model, while using 58.8% fewer FLOPs in MHSA. Furthermore, Sparsifiner-S models with high attention budgets of 79 and above achieved superior top-1 accuracy compared with the full-rank DeiT-S [33] model, while using fewer FLOPs in MHSA. This suggests that Sparsifiner's sparse full-rank attention reconstruction mechanism induces a useful regularization effect that improves model generalization.

TABLE 2

| Att. keep rate | Att. num. | MHSA (MFLOPs) | Top-1 Acc (%) |
|---|---|---|---|
| 1.0 (DeiT-S [33]) | 197 | 357.7 | 79.82 |
| 0.9 | 178 | 396.8 | 80.02 |
| 0.8 | 158 | 360.6 | 79.97 |
| 0.7 | 138 | 324.6 (−9%) | 79.96 |
| 0.6 | 119 | 290.3 (−19%) | 79.98 |
| 0.5 | 99 | 254.2 (−29%) | 79.94 |
| 0.4 | 79 | 218.0 (−39%) | 79.92 |
| 0.3 | 60 | 183.6 (−49%) | 79.83 |
| 0.2 | 40 | 147.5 (−59%) | 79.71 |
| 0.1 | 20 | 111.4 (−69%) | 79.42 |
| 0.05 | 10 | 93.3 (−74%) | 78.75 |
| 0.01 | 2 | 78.9 (−78%) | 73.03 |

Table 2 shows an effect of attention budget on FLOPs and top-1 accuracy. Here the "keep rate" refers to the number of attention connectivities retained at each layer. All other attention connectivities in the sparse full-rank attention matrix (Eq. 4) are set to zero. When keeping only 10 attention connectivities, Sparsifiner produces a top-1 accuracy reduced by only 1.0% compared to the full-attention baseline DeiT-S [33], but with a 73.9% reduction in FLOPs. The input resolution for the experiments was 224×224.

Accelerating ViT on high-resolution images—To show the effectiveness of Sparsifiner method(s) and technique(s) on larger input size, experiments applied Sparsifiner to DeiT-T [33] with 384×384 resolution (Table 3) defining an embodiment Sparsifiner-T. When dealing with high-resolution images, due to quadratic complexity in the number of tokens, MHSA becomes increasingly expensive compared to the feedforward operations. The MHSA complexity of the DeiT-T [33] model with 384×384 input was reduced by over 80% with less than 1% accuracy drop. Sparsifiner method(s) and techniques show a great potential to accelerate ViT on even higher resolution images where token quantity dominates the model complexity.

TABLE 3

| Model | Att. keep rate | MHSA (MFLOPs) | Overall (GFLOPs) | Top-1 Acc (%) |
|---|---|---|---|---|
| DeiT-T | 1.0 | 1534.1 | 3.58 | 75.45 |
| Sparsifiner-T | 0.5 | 851.0 (−45%) | 2.89 (−19%) | 75.45 |
| Sparsifiner-T | 0.25 | 452.9 (−70%) | 2.49 (−30%) | 75.35 |
| Sparsifiner-T | 0.1 | 240.5 (−84%) | 2.28 (−36%) | 74.58 |

Table 3 shows results on high resolution 384×384 images. Data show that Sparsifiner reduced the MHSA complexity of DeiT-T-384 [33] by over 84% with modest accuracy drop. Since the number of tokens is quadratic in the resolution, Sparsifiner can reduce a larger portion of MHSA complexity on high-resolution images.

Low-rank: connectivities or attention?—The approach of Sparsifiner raised a research question: does the utility of the dense low-rank attention matrix come from its use as a connectivity mask? Or is it sufficient to directly use the dense low-rank attention matrix, foregoing the need to reconstruct the sparse full-rank attention matrix, i.e., the Linformer approach? This question was answered by comparing the top-1 accuracy of the two approaches (Table 4). In this experiment, Sparsifiner-S and Linformer [36] were trained under identical settings, differing only in the attention approximation method. Sparsifiner-S uses a reconstructed sparse full-rank attention matrix, while Linformer uses the dense low-rank attention matrix directly. In order to give both models similar representational capacity, the low-rank dimension of Linformer [36] is set to equal the sparse attention budget of Sparsifiner-S. This enforces that the attention-value product of both models' MHSA has the same complexity.

TABLE 4

| Model | MHSA (MFLOPs) | Top-1 Acc (%) |
| --- | --- | --- |
| Linformer [36] | 246.73 | 77.54 |
| Sparsifiner-S (ours) | 224.04 | 79.79 |

Table 4 data show a comparison of sparse full-attention reconstruction with low-rank attention reconstruction. Sparsifiner-S achieves a 2.1% absolute percentage point improvement in top-1 accuracy compared with Linformer [36]. This improvement reinforces the superiority of using the low-rank query-key product as a connectivity mask, rather than using the low-rank attention matrix directly. Using the low-rank attention matrix to directly compute the attention-value product with a down-projected value discards the long tail of the full attention matrix's eigenspectrum [36]. In contrast, using the low-rank query-key product as a connectivity mask reduces computation by a different mechanism. By using a low-rank connectivity mask to produce a sparse full-rank attention matrix, the long-tail of the full attention matrix's eigenspectrum is preserved. Based on the significant improvement in top-1 accuracy, it can be concluded that these long-tail eigenvalues are important for model predictive quality in ViTs.

Figure 6:
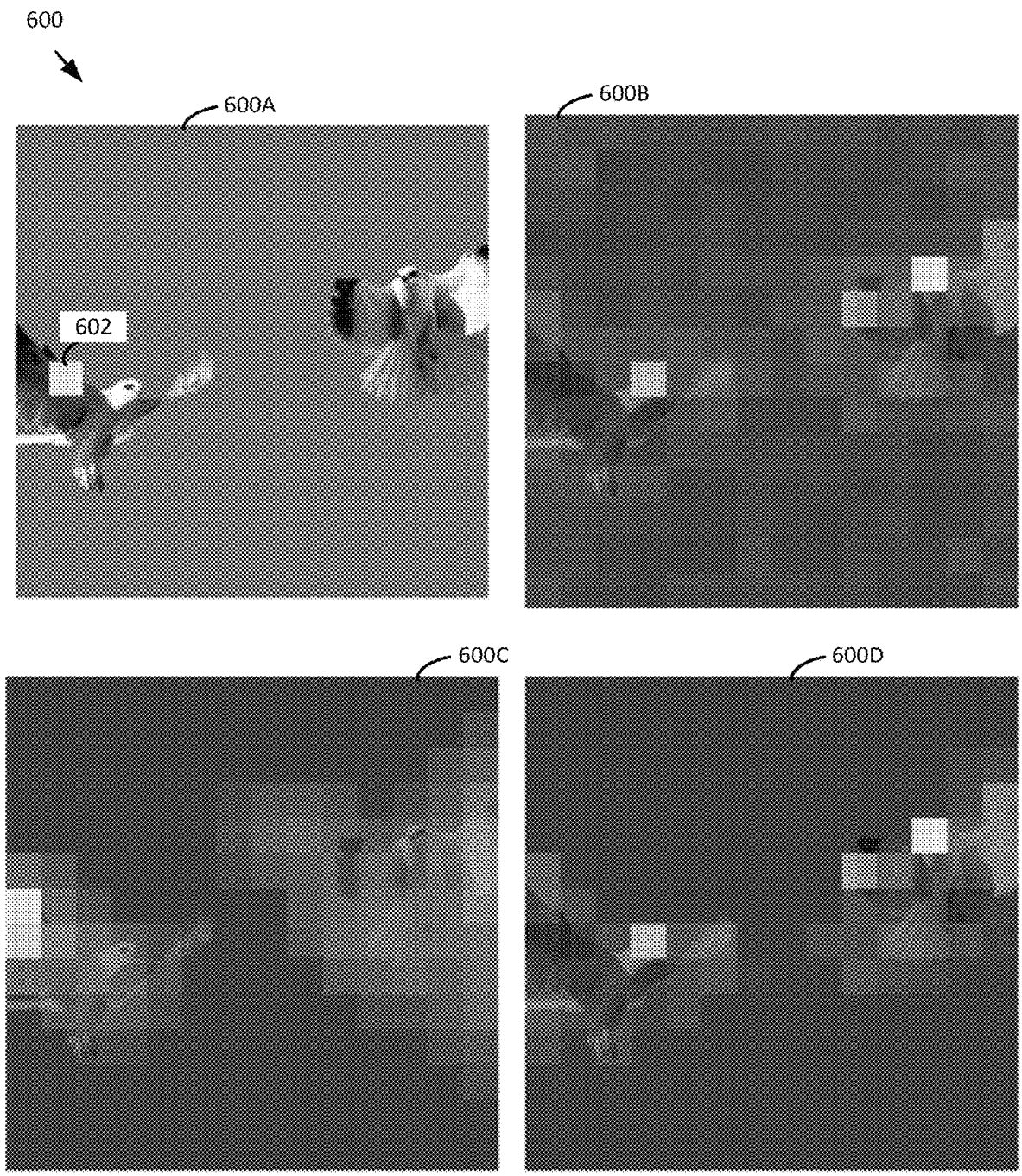
FIG. 6 is an array of images showing comparative results in accordance with one or more experiments.

Low- and full-rank attention visualization—FIG. 6 shows an array of images 600 including input image 600A, are respective heatmap images 600B, 600C and 600D. In order to further illuminate the qualitative difference between low- and full-rank attention in ViTs, FIG. 6 shows the full attention heatmap 600B (naïve MHSA), the low rank attention heapmap 600C (Linformer), and masked attention heatmap 600D (sparse full rank heatmap) (Sparsifiner) for a query patch 602. FIG. 6 shows that a connectivity mask can accurately preserve key tokens that are highly related to the query patch and remove the irrelevant ones. As a result, the masked attention heatmap preserves structure and discards noise compared with the full attention heatmap. The visualization results also validate that Sparsifiner can effectively approximate the full attention ViT. Due to discarding the long tail of the attention matrix's eigenspectrum, low-rank attention produces a coarse attention map. By contrast, sparse full-rank attention bears closer resemblance to full attention with low-salience connectivities discarded.

Figure 7:
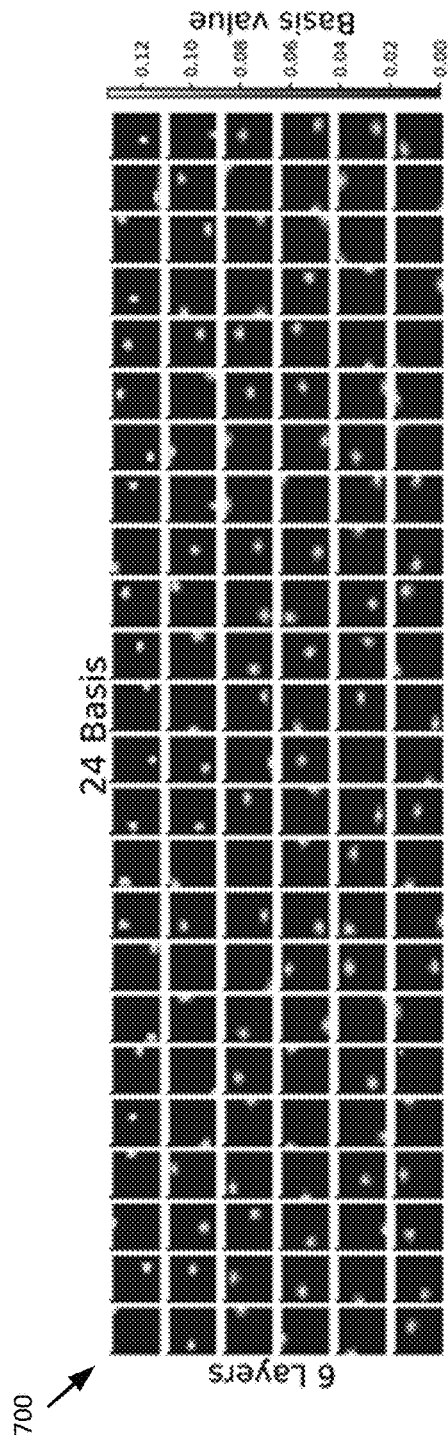
FIGS. 7 and 8 are visualizations of various MHSA module data in accordance with one or more embodiments.

Sparse low-rank basis and up-projection matrix visualization—FIG. 7 is an array of images 700 to demonstrate that the connectivity mask can be computed by sparse-sparse matrix multiplication. The array 700 visualizes the up-projection matrix $W^{up}$ of the first six layers of Sparsifiner. Because the reconstructed sparse attention matrix is a combination of the up-projection matrix's weights, it is referenced as a sparse basis. Array 700 shows 24 dimensions of the sparse basis. Dark weights (originally in blue color) indicate low values, which are pruned after training so that only the bright (originally yellow) weights are left over. Qualitatively, the sparse basis has a high level of sparsity, making sparse attention reconstruction efficient. Sparsifiner naturally learns a sparse basis of local regions resembling 2D Gaussians. For a given token, the sparse bases corresponding to object locations with salient semantic and/or spatial information will activate. Since the sparse attention reconstruction (Eq. 5) is a product of the sparse low-rank attention matrix with the up-projection matrix, the post-softmax low-rank attention matrix is also visualized in array of images 800 of FIG. 8. FIG. 8 shows visualization of the sparse basis coefficient of the 5th attention head over 12 layers of Sparsifiner-S. Dark (originally blue) regions indicate low values that are pruned before sparse attention reconstruction during inference, leaving only bright (originally yellow) coefficients. Qualitatively, the sparse coefficient also exhibits a high degree of sparsity, further validating the efficiency of the sparse attention reconstruction via sparse-sparse matrix multiplication.

The methods, systems and techniques herein seek to provide a novel computationally efficient approach to learn unstructured, instance-dependent attention in ViTs. To address aforementioned challenges related to ViTs, the methods, systems and techniques herein learn to compute sparse connectivity patterns over attention that are both instance-dependent and unstructured. The instance-dependent nature of the attention pattern allows each token to use its limited attention budget of nonzero elements more efficiently compared to fixed sparse attention patterns. For example, in attention heads that attend to semantic rather than positional content [34, 35], tokens containing similar semantic information should be considered to have high connectivity scores despite their spatial distance. Similarly, nearby tokens with irrelevant semantic relation should have lower connectivity scores despite their spatial proximity. Furthermore, the methods, systems and techniques herein seek to improve attention pattern flexibility compared to token pruning by pruning individual connectivities, instead of entire rows and columns of the attention matrix. This approach results in reduce FLOPs in the early layers of the network without incurring significant top-1 accuracy degradation. By pruning individual connectivities dependent on image content, the methods, systems and techniques herein generalize prior approaches to sparsifying MHSA in ViTs, and in doing so produces a favourable trade-off between accuracy and FLOPs.

The following paragraphs provide consistory statement support for at least some of the systems, methods and techniques disclosed herein. Other aspects will be apparent, such as a computer program product aspect having a non-transitory storage device storing instructions that when executed by a processor of a computing device cause the computing device to perform steps of a method aspect herein.

Statement 1: A computing device comprising a processor and a non-transitory storage device storing instructions that when executed by the processor cause the computing device to perform steps for image processing an image or a series of images, the steps comprising: storing a deep neural network model defining a Vision Transformer (ViT); and processing the image or series of images with the ViT to provide the image processing for the image or series of images; wherein the ViT comprises a plurality of multi-head self-attention (MHSA) modules arranged in successive layers and each MHSA attention module is configured to, in respect of a layer l of the plurality of layers: use sparse full attention patterns determined by a lightweight connectivity predictor module to estimate a connectivity score of each pair of input tokens for the layer l; and use sparse matrix computation techniques to accelerate the ViT.

Statement 1: The computing device of statement 1 wherein each MHSA attention model is configured to: determine a sparse connectivity mask M using layer input, the mask M determined according to a trained connectivity mask predictor; determine elements of a sparse full attention matrix Ã from elements of a full attention matrix A according to the sparse connectivity mask M, wherein the elements of the full attention matrix A are defined using the layer input and a compatibility function; and produce layer output using the sparse full attention matrix Ã.

Statement 3: The computing device of statement 2, wherein the compatibility function is defined in accordance a scaled dot product attention mechanism.

Statement 4: The computing device of statement 2 or 3, wherein to determine the elements of the sparse full attention matrix Ã, the sparse connectivity mask M is used to select which of the elements of the full attention matrix A are computed using the compatibility function.

Statement 5: The computing device of any one of statements 2 to 4, wherein: the layer input ($X^l$) defines each of a query matrix ($Q=X^l W^Q$), a key matrix ($K=X^l W^K$) and a value matrix (V), wherein $W^Q$ and $W^K$ are each learned projection matrices; and the layer input $X^l$ is mapped to the layer output $X^{l+1}$ using a weighted sum of the value matrix V according to elements of the sparse full attention pattern matrix Ã.

Statement 6: The computing device of statement 5, wherein, for the layer l, the sparse connectivity mask M is determined by: computing a low rank attention matrix approximation ($A^{down}$) in accordance with Eq. 1, where $W^{down}$ is a learned projection matrix to down project matrix K; and applying a threshold value to sparsely populate $A^{down}$ according to Eq. 2.

Statement 7: The computing device of statement 6, wherein each MHSA module is configured to use sparse matrix computing techniques in respect of $A^{down}$ to account for zero valued elements.

Statement 8: The computing device of any one of statements 6 or 7 wherein, for the layer l, wherein each MHSA module is further configured to determine the sparse connectivity mask M by: up projecting $A^{down}$ by applying a sparse up-projection matrix $W^{up}$ using sparse sparse matrix multiplication, wherein $W^{up}$ is a learned projection matrix to up project matrix $A^{down}$; and defining mask M with binary values in accordance with Eq. 3.

Statement 9: The computing device of statement 8: wherein each MHSA module is configured to use sparse matrix computing techniques in respect of mask M to account for zero valued elements.

Statement 10: The computing device of any one of statements 5 to 9, wherein to producing the layer output $X^{l+1}$ each MHSA module is configured to: determine elements of the sparse full attention matrix Ã using mask M in accordance with Eq. 4 or Eq. 5; and determine $X^{l+1}$ in accordance with Eq. 6.

Statement 11: The computing device of statement 10, wherein each MHSA module is configured to use sparse element wise multiplication to skip multiplication by zero in Eq. 5.

Statement 12: The computing device of any one of statements 2 to 11, wherein image processing comprises image classification, object detection, or semantic segmentation for the image.

Statement 13: The computing device of any one of statements 2 to 12, wherein l is the first layer of the plurality of layers and the ViT is configured to define the layer input for the first layer as a set of n tokens X, each token comprising a patch embedding defined using linear projection of non-overlapping images patches of the image and a positional encoding.

Statement 14: The computing device of any one of statements 2 to 13, wherein each MHSA module is further configured to use a token pruning technique to reduce the layer input for reducing computational complexity of a determination of self-attention and wherein the determination of the mask M and the elements of matrices A and A are determined relative to the layer input as reduced using the token pruning technique.

Statement 15: A computing device to provide a virtual try on experience, the device comprising a processor and a non-transitory storage device (e.g. a memory) storing instructions that when executed by the processor cause the computing device to: provide a face tracker engine comprising a ViT to localize a face feature of a face in an input image; and, provide an effects pipeline configured to generate an output image for presentation, the output image derived from the input image, and comprising an effect associated with the face feature; wherein the ViT comprises a plurality of multi-head self-attention (MHSA) modules arranged in successive layers configured to, in respect of a layer (l) of the plurality of layers: use sparse full attention patterns determined by a lightweight connectivity predictor module to estimate a connectivity score of each pair of input tokens for the layer l; and use sparse computation techniques to accelerate the ViT.

Statement 16: The computing device of statement 15, wherein any one or more of: (i) the effect comprises any one or more of a size effect, a shape effect, a hair effect, a nail effect, or a makeup effect; (ii) the effects pipeline is configured to overlay the effect on the input image for defining the output image; or (iii) the effect relates to a product associated with a brand and the effect is obtained from a data store storing effects for the brand.

Statement 17: The computing device of statement 15 or 16, wherein the ViT is configured as in any one of statements 2 to 14.

Statement 18: A method comprising: processing an image with a Vision Transformer (ViT) to obtain image processing results for the image; and providing the image processing results for the image, wherein the ViT is configured as in any one of statements 1 to 14.

Statement 19: A method comprising: providing a previously trained Vision Transformer (ViT) deep neural network configured with a plurality of multi-head self-attention (MHSA) modules arranged in successive layers, each module configured to perform naïve MHSA; adapting each module to be configured to, in respect of a layer (l) of the plurality of layers: use sparse full attention patterns determined by a lightweight connectivity predictor module to estimate a connectivity score of each pair of input tokens for the layer l; and use sparse computation techniques to accelerate the VIT; and training the ViT as adapted.

Statement 20: The method of statement 19, wherein the ViT is configured as in any one of statements 2 to 14.

Statement 21: A system, comprising: a Vision Transformer (ViT) configured to parse a digital image forming part of an augmented reality experience into smaller flattened image patches, the Vit trained to recognize/classify objects digitally encoded in the flattened image patches and to generate image classification information, object detection information, image segmentation information, or temporal action detection information; and an augmented reality component operably coupled to an effect pipeline component including computational circuitry configured to apply an effect transform to an image derived from the parsed digital image, the effect transform chosen responsive to generating the image classification information, the object detection information, the image segmentation information, or the temporal action detection information.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

Each reference below is incorporated herein in its respective entirety.
 [1] Iz Beltagy, Matthew E Peters, and Arman Cohan. Long former: The long-document transformer. *arXiv preprint arXiv:* 2004.05150, 2020.
 [2] Gedas Bertasius, Heng Wang, and Lorenzo Torresani. Is space-time attention all you need for video understanding? In *ICML*, volume 2, page 4, 2021.
 [3] Nicolas Carion, Francisco Massa, Gabriel Synnaeve, Nicolas Usunier, Alexander Kirillov, and Sergey Zagoruyko. End-to-End Object Detection with Transformers. In *ECCV,* 2020.
 [4] Nicolas Carion, Francisco Massa, Gabriel Synnaeve, Nicolas "Usunier, Alexander Kirillov, and Sergey Zagoruyko. End-to-end object detection with trans- formers. In *European conference on computer vision*, pages 213-229. Springer, 2020.
 [5] Mark Chen, Alec Radford, Rewon Child, Jeffrey Wu, Hee-woo Jun, David Luan, and Ilya Sutskever. Generative pre-" training from pixels. In *International conference on machine "learning*, pages 1691-1703. PMLR, 2020.
 [6] Bowen Cheng, Ishan Misra, Alexander G. Schwing, Alexander Kirillov, and Rohit Girdhar. Masked-attention mask transformer for universal image segmentation. 2022."
 [7] Bowen Cheng, Alexander G. Schwing, and Alexander Kirillov. Per-pixel classification is not all you need for semantic segmentation. 2021.
 [8] Rewon Child, Scott Gray, Alec Radford, and Ilya Sutskever. Generating long sequences with sparse transformers. In *arXiv:* 1904.10509, 2019.
 [9] Krzysztof Marcin Choromanski, Valerii Likhosherstov, David Dohan, Xingyou Song, Andreea Gane, Tamas Sar-los, Peter Hawkins, Jared Quincy Davis, Afroz Mohiuddin, Lukasz Kaiser, David Benjamin Belanger, Lucy J Colwell, and Adrian Weller. Rethinking attention with performers. In *ICLR,* 2021.
 [10] Zhigang Dai, Bolun Cai, Yugeng Lin, and Junying Chen. Up-detr: Unsupervised pre-training for object detection with transformers. In *Proceedings of the IEEE/CVF conference on computer vision and pattern recognition*, pages 1601-1610, 2021.
 [11] Jia Deng, Wei Dong, Richard Socher, Li-Jia Li, Kai Li, and Li Fei-Fei. Imagenet: A Large-scale Hierarchical Image Database. In CVPR, 2009.
 [12] Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An Image is Worth 16×16 Words: Transformers for Image Recognition at Scale. In *ICLR,* 2021.
 [13] Brendan Duke, Abdalla Ahmed, Christian Wolf, Parham Aarabi, and Graham W. Taylor. SSTVOS: Sparse Spatiotemporal Transformers for Video Object Segmentation. In *CVPR,* 2021.
 [14] Qihua Feng, Peiya Li, Zhixun Lu, Chaozhuo Li, Zefang Wang, Zhiquan Liu, Chunhui Duan, and Feiran Huang. Evit: Privacy-preserving image retrieval via encrypted vision transformer in cloud computing. *arXiv preprint arXiv:* 2208.14657, 2022.
 [15] Jonathan Ho, Nal Kalchbrenner, Dirk Weissenborn, and Tim Salimans. Axial attention in multidimensional transformers. *arXiv preprint arXiv:* 1912.12180, 2019.
 [16] Zi-Hang Jiang, Qibin Hou, Li Yuan, Daquan Zhou, Yujun Shi, Xiaojie Jin, Anran Wang, and Jiashi Feng. All tokens matter: Token labeling for training better vision transformers. *Advances in Neural Information Processing Systems,* 34:18590-18602, 2021.
 [17] Angelos Katharopoulos, Apoorv Vyas, Nikolaos Pappas, and François Fleuret. Transformers are rnns: Fast autoregressive transformers with linear attention. In *International Conference on Machine Learning*, pages 5156-5165. PMLR, 2020.
 [18] Nikita Kitaev, Łukasz Kaiser, and Anselm Levskaya. Reformer: The efficient transformer. *arXiv preprint arXiv:* 2001.04451, 2020.
 [19] Juho Lee, Yoonho Lee, Jungtaek Kim, Adam Kosiorek, Seungjin Choi, and Yee Whye Teh. Set transformer: A frame-work for attention-based permutation-invariant neural net-works. In *International conference on machine learning*, pages 3744-3753. PMLR, 2019.
 [20] Ze Liu, Han Hu, Yutong Lin, Zhuliang Yao, Zhenda Xie, Yixuan Wei, Jia Ning, Yue Cao, Zheng Zhang, Li Dong, Furu Wei, and Baining Guo. Swin transformer v2: Scaling up capacity and resolution. In *CVPR,* 2022.
 [21] Ze Liu, Yutong Lin, Yue Cao, Han Hu, Yixuan Wei, Zheng Zhang, Stephen Lin, and Baining Guo. Swin transformer: Hierarchical vision transformer using shifted windows. In *ICCV*, 2021.

[22] Niki Parmar, Ashish Vaswani, Jakob Uszkoreit, Lukasz Kaiser, Noam Shazeer, Alexander Ku, and Dustin Tran. Image transformer. In *International conference on machine learning*, pages 4055-4064. PMLR, 2018.

[23] Hao Peng, Nikolaos Pappas, Dani Yogatama, Roy Schwartz, Noah A Smith, and Lingpeng Kong. Random feature attention. *arXiv preprint arXiv:* 2103.02143, 2021.

[24] Jiezhong Qiu, Hao Ma, Omer Levy, Scott Wen-tau Yih, Sinong Wang, and Jie Tang. Blockwise self attention for long document understanding. *arXiv preprint arXiv:* 1911.02972, 2019.

[25] Jack W Rae, Anna Potapenko, Siddhant M Jayakumar, and Timothy P Lillicrap. Compressive transformers for long-range sequence modelling. *arXiv preprint arXiv:* 1911.05507, 2019.

[26] Yongming Rao, Wenliang Zhao, Benlin Liu, Jiwen Lu, Jie Zhou, and Cho-Jui Hsieh. DynamicViT: Efficient Vision Transformers with Dynamic Token Sparsification. In *Advances in Neural Information Processing Systems* (NeurIPS), 2021.

[27] Cedric Renggli, Andre Susano Pinto, Neil Houlsby, Basil Mustafa, Joan Puigcerver, and Carlos Riquelme. Learning to merge tokens in vision transformers. *arXiv preprint arXiv:* 2202.12015, 2022.

[28] Aurko Roy, Mohammad Saffar, Ashish Vaswani, and David Grangier. Efficient content-based sparse attention with routing transformers. *Transactions of the Association for Computational Linguistics*, 9:53-68, 2021.

[29] Michael Ryoo, AJ Piergiovanni, Anurag Arnab, Mostafa Dehghani, and Anelia Angelova. TokenLearner: Adaptive Space-Time Tokenization for Videos. In *NeurIPS*, 2021.

[30] Yehui Tang, Kai Han, Yunhe Wang, Chang Xu, Jianyuan Guo, Chao Xu, and Dacheng Tao. Patch slimming for efficient vision transformers. In *CVPR*, 2022.

[31] Yehui Tang, Kai Han, Yunhe Wang, Chang Xu, Jianyuan Guo, Chao Xu, and Dacheng Tao. Patch slimming for efficient vision transformers. In *Proceedings of the IEEE/CVF Conference on Computer Vision and Pattern Recognition*, pages 12165-12174, 2022.

[32] Yi Tay, Dara Bahri, Liu Yang, Donald Metzler, and Da-Cheng Juan. Sparse sinkhorn attention. In *International Conference on Machine Learning*, pages 9438-9447. PMLR, 2020.

[33] Hugo Touvron, Matthieu Cord, Matthijs Douze, Francisco Massa, Alexandre Sablayrolles, and Herve Jegou. Training Data-efficient Image Transformers & Distillation through Attention. In *ICML*, 2021.

[34] Ashish Vaswani, Noam Shazeer, Niki Parmar, Jakob Uszko-reit, Llion Jones, Aidan N Gomez, Łukasz Kaiser, and Illia Polosukhin. Attention is all you need. In *NeurIPS*. 2017.

[35] Elena Voita, David Talbot, Fedor Moiseev, Rico Sennrich, and Ivan Titov. Analyzing multi-head self-attention: Specialized heads do the heavy lifting, the rest can be pruned. In *ACL*, 2019.

[36] Sinong Wang, Belinda Z. Li, Madian Khabsa, Han Fang, and Hao Ma. Linformer: Self-attention with linear complexity, 2020.

[37] Wenhai Wang, Enze Xie, Xiang Li, Deng-Ping Fan, Kaitao Song, Ding Liang, Tong Lu, Ping Luo, and Ling Shao. Pyramid vision transformer: A versatile backbone for dense prediction without convolutions. In *Proceedings of the IEEE/CVF International Conference on Computer Vision*, pages 568-578, 2021.

[38] Li Yuan, Yunpeng Chen, Tao Wang, Weihao Yu, Yujun Shi, Zi-Hang Jiang, Francis E H Tay, Jiashi Feng, and Shuicheng Yan. Tokens-to-token vit: Training vision transformers from scratch on imagenet. In *Proceedings of the IEEE/CVF International Conference on Computer Vision*, pages 558-567, 2021.

[39] Manzil Zaheer, Guru Guruganesh, Kumar Avinava Dubey, Joshua Ainslie, Chris Alberti, Santiago Ontanon, Philip Pham, Anirudh Ravula, Qifan Wang, Li Yang, et al. Big Bird: Transformers for Longer Sequences. In N*eurIPS*, 2020.

[40] Wang Zeng, Sheng Jin, Wentao Liu, Chen Qian, Ping Luo, Wanli Ouyang, and Xiaogang Wang. Not all tokens are equal: Human-centric visual analysis via token clustering transformer. In *Proceedings of the IEEE/CVF Conference on Computer Vision and Pattern Recognition*, pages 11101-11111, 2022.

[41] Yanhong Zeng, Jianlong Fu, and Hongyang Chao. Learning joint spatial-temporal transformations for video inpainting. In *European Conference on Computer Vision*, pages 528-543. Springer, 2020.

[42] Pengchuan Zhang, Xiyang Dai, Jianwei Yang, Bin Xiao, Lu Yuan, Lei Zhang, and Jianfeng Gao. Multi-scale vision long-former: A new vision transformer for high-resolution image encoding. In *Proceedings of the IEEE/CVF International Conference on Computer Vision*, pages 2998-3008, 2021.

[43] Minghang Zheng, Peng Gao, Renrui Zhang, Kunchang Li, Xiaogang Wang, Hongsheng Li, and Hao Dong. End-to-end object detection with adaptive clustering transformer. *arXiv preprint arXiv:* 2011.09315, 2020.

[44] Luowei Zhou, Yingbo Zhou, Jason J Corso, Richard Socher, and Caiming Xiong. End-to-end dense video captioning with masked transformer. In *Proceedings of the IEEE conference on computer vision and pattern recognition*, pages 8739-8748, 2018.

[45] Xizhou Zhu, Weijie Su, Lewei Lu, Bin Li, Xiaogang Wang, and Jifeng Dai. Deformable detr: Deformable transformers for end-to-end object detection. *arXiv preprint arXiv:* 2010.04159, 2020.

The invention claimed is:

1. A computing device comprising a processor and a non-transitory storage device storing instructions that, when executed by the processor, cause the computing device to perform steps for image processing an image or a series of images, the steps comprising:

storing a deep neural network model defining a Vision Transformer (ViT); and processing the image or the series of images with the ViT to provide the image processing for the image or the series of images;

wherein the ViT comprises a plurality of multi-head self-attention (MHSA) modules arranged in successive layers and each MHSA attention module is configured to, in respect of a layer l of the plurality of layers: use instance-dependent and meaningful sparse full-rank attention patterns that limit the number of connections as determined by a trained lightweight connectivity predictor module to estimate a connectivity score of each pair of input tokens for the layer l, including determining a low rank approximation matrix $A^{down}$ of a full-rank attention matrix A, thresholding elements of matrix $A^{down}$ to provide a sparse matrix $\tilde{A}^{down}$; and
using matrix $\tilde{A}^{down}$ for performing sparse matrix computation techniques to provide the sparse full-rank attention patterns as a sparse full-rank attention matrix $\tilde{A}$ to accelerate the ViT.

2. The device of claim 1, wherein each MHSA attention module is configured to:
  determine an up-projected sparse connectivity mask M using layer input, the matrix $\tilde{A}^{down}$, a selection function to select most significant connectivity scores, and binarization to define mask M, the mask M determined according to a trained connectivity mask predictor;
  determine elements of the matrix $\tilde{A}$ from elements of a full-rank attention matrix A according to the sparse connectivity mask M, wherein the elements of the full attention matrix A are defined using the layer input and a compatibility function; and
  produce layer output using the sparse full-rank attention matrix $\tilde{A}$.

3. The device of claim 2, wherein the compatibility function is defined in accordance a scaled dot product attention mechanism.

4. The device of claim 2, wherein to determine the elements of the sparse full attention matrix $\tilde{A}$ the sparse connectivity mask M is used to select which of the elements of the full-rank attention matrix A are computed using the compatibility function.

5. The device of claim 2, wherein:
  the layer input ($X^l$) defines each of a query matrix ($Q=X^l W^Q$), a key matrix ($K=X^l W^K$) and a value matrix (V), wherein $W^Q$ and $W^K$ are each learned projection matrices; and
  the layer input $X^k$ is mapped to the layer output $X^{l+1}$ using a weighted sum of the value matrix V according to elements of the sparse full-rank attention matrix $\tilde{A}$.

6. The device of claim 5, wherein, for the layer l, the sparse connectivity mask M is determined by:
  computing the low rank attention matrix approximation ($A^{down}$) in accordance with Eq. 1:

$$A^{down} = softmax\left(\frac{Q(W^{down}K)^T}{\sqrt{d}}\right), \quad (1)$$

where:
  d is a dimensionality for query vectors and key vectors in query matrix Q and key matrix K;
  T is a sequence length;
  softmax is a normalization function;
  ij are row and column indices; and
  $W^{down}$ is a learned projection matrix to down project matrix K to a lower dimension; and
applying a threshold value (τ) to sparsely populate $\tilde{A}^{down}$ according to Eq. 2:

$$\tilde{A}_{ij}^{down} = \begin{cases} A_{ij}^{down} & \text{if } A_{ij}^{down} > \tau \\ 0 & \text{otherwise} \end{cases}. \quad (2)$$

7. The device of claim 6, wherein each MHSA module is configured to use sparse matrix computing techniques in respective of $\tilde{A}^{down}$ to account for zero valued elements.

8. The device of claim 6, wherein, for the layer l, wherein each MHSA module is further configured to determine the sparse connectivity mask M by:
  up projecting $\tilde{A}^{down}$ by applying a sparse up-projection matrix $W^{up}$ using sparse-sparse matrix multiplication, wherein $W^{up}$ is a learned projection matrix; and
  defining mask M with binary values in accordance with Eq. 3:

$$M = 1\left[Top - k\left(W^{up}\tilde{A}^{down}\right)\right] \quad (3)$$

where Top-k is a selection function selecting top scores from the up-projected sparse attention matrix $W^{up}\tilde{A}^{down}$ and k is a budget size.

9. The device of claim 8, wherein each MHSA module is configured to use sparse matrix computing techniques in respective of mask M to account for zero valued elements.

10. The device of claim 5, wherein to produce the layer (l) output $X^{l+1}$ each MHSA module is configured to:
  determine elements of the sparse full attention matrix $\tilde{A}$ A using mask M in accordance with Eq. 4:

$$\tilde{A}_{ij} = softmax\left(\frac{QK^T}{\sqrt{d}}\right)_{ij} \text{ iff } M_{ij} = 1, \quad (4)$$

where:
  Q and K are query and key matrices and d is a dimensionality for query and key vectors therein;
  T is a sequence length;
  softmax is a normalization function; and
  ij are row and column indices:
  or Eq. 5, where $\odot_{sparse}$ is the sparse element-wise product operator, which skips multiplications by zero:

$$\tilde{A} = M \odot_{sparse} A; \text{ and} \quad (5)$$

determine $X^{l+1}$ in accordance with Eq. 6:

$$X^{l+1} = \tilde{A}V. \quad (6)$$

11. The device of claim 10, wherein each MHSA module is configured to use sparse element wise multiplication to skip multiplication by zero in Eq. 5.

12. The device of claim 2, wherein l is the first layer of the plurality of layers and the ViT is configured to define the layer input for the first layer as a set of n tokens X, each token comprising, for the image or each image of the series of images, a patch embedding defined using linear projection of non-overlapping image patches and a positional encoding.

13. The device of claim 2, wherein each MHSA module is further configured to use a token pruning technique to reduce the layer input for reducing computational complexity of a determination of self-attention and wherein the determination of the mask M and the elements of matrices A and $\tilde{A}$ are determined relative to the layer input as reduced using the token pruning technique.

14. The device of claim 1, wherein image processing comprises any one or more of image classification, object detection, semantic segmentation, image generation, or temporal action detection in relation to the image or each image of the series of images.

15. A computing device to provide a virtual try on experience, the device comprising a processor and a non-transitory storage device storing instructions that when executed by the processor cause the computing device to provide:
- a face tracker engine comprising a deep neural network model defining a Vision Transformer (ViT) to localize a face feature of a face in an input image or each input image of a series of input images; and,
- an effects pipeline configured to define an output image or series of output images for presentation, the output image derived from the input image or the series of output images derived from the series of input images, and comprising an effect associated with the face feature;
- wherein the ViT comprises a plurality of multi-head self-attention (MHSA) modules arranged in successive layers and each MHSA attention module is configured to, in respect of a layer l of the plurality of layers, use sparse full-rank attention patterns that limit the number of connections as determined by a trained lightweight connectivity predictor module to estimate a connectivity score of each pair of input tokens for the layer l, including:
- determining a low rank approximation of a full-rank attention pattern;
- thresholding the low rank approximation to make the approximation sparse; and
- using the sparse approximation for performing sparse matrix computation techniques to provide the sparse full-rank attention patterns to accelerate the ViT.

16. The computing device of claim 15, wherein the effect comprises any one or more of a size effect, a shape effect, a hair effect, a nail effect, or a makeup effect.

17. The computing device of claim 15, wherein the effects pipeline is configured to overlay the effect on the input image for defining the output image or on each input image of the series of input images for defining each output image of the series of output images.

18. The computing device of claim 15, wherein the effect relates to a product associated with a brand and the effect is obtained from a data store storing effects for the brand.

19. A method comprising: processing an image with a Vision Transformer (ViT) to obtain image processing results; and providing the image processing results for the image; and
- wherein the ViT comprises a plurality of multi-head self-attention (MHSA) modules arranged in successive layers and each MHSA attention module is configured to, in respect of a layer (l) of the plurality of layers use sparse full-rank attention patterns that limit the number of connections as determined by a trained lightweight connectivity predictor module to estimate a connectivity score of each pair of input tokens for the layer l, including:
- determining a low rank approximation of a full-rank attention pattern;
- thresholding the low rank approximate to make the approximation sparse; and
- using the sparse approximation for performing sparse matrix computation techniques to provide the sparse full-rank attention patterns to accelerate the ViT.

20. The method of claim 19, wherein each MHSA attention model is configured to:
- determine a sparse connectivity mask M using layer input, and the sparse approximation, the mask M determined according to the trained lightweight connectivity predictor;
- determine elements of a sparse full attention matrix $\tilde{A}$ from elements of a full attention matrix A according to the sparse connectivity mask M, wherein the elements of the full attention matrix A are defined using the layer input and a compatibility function; and
- produce layer output using the sparse full attention matrix $\tilde{A}$.

21. A system, comprising:
- a Vision Transformer (ViT) configured to parse a digital image forming part of an augmented reality experience into smaller flattened image patches, the ViT trained to recognize/classify objects digitally encoded in the flattened image patches and to generate image classification information, object detection information, image segmentation information, or temporal action detection information; and
- an augmented reality component operably coupled to an effect pipeline component including computational circuitry configured to apply an effect transform to an image derived from the parsed digital image, the effect transform chosen responsive to generating the image classification information, the object detection information, the image segmentation information, or the temporal action detection information; and
- wherein the ViT comprises a plurality of multi-head self-attention (MHSA) modules arranged in successive layers and each MHSA attention module is configured to, in respect of a layer (l) of the plurality of layers, use instance-dependent and meaningful sparse full-rank attention patterns that limit the number of connections as determined by a trained lightweight connectivity predictor module to estimate a connectivity score of each pair of input tokens for the layer l, including:
- determining a low rank approximation of a full-rank attention pattern:
- thresholding the low rank approximate to make the approximation sparse;
- using the sparse approximation for performing sparse matrix computation techniques to provide the sparse full-rank attention patterns to accelerate the ViT; and
- producing layer output using the sparse full attention patterns.

* * * * *